US010256767B1

(12) United States Patent
Sinai et al.

(10) Patent No.: US 10,256,767 B1
(45) Date of Patent: Apr. 9, 2019

(54) SYSTEM AND METHOD FOR MOUNTING PV PANELS IN BRACKET AND/OR RAIL MOUNT DESIGN

(71) Applicant: Orion Solar Racking, Inc., Commerce, CA (US)

(72) Inventors: Bob Sinai, Pacific Palisades, CA (US); Cael Schwartzman, Long Beach, CA (US); Isaiah G. Contreras, Corona, CA (US)

(73) Assignee: ORION SOLAR RACKING, INC., Commerce, CA (US)

( * ) Notice: Subject to any disclaimer, the term of this patent is extended or adjusted under 35 U.S.C. 154(b) by 0 days.

(21) Appl. No.: 14/872,058

(22) Filed: Sep. 30, 2015

Related U.S. Application Data

(60) Provisional application No. 62/059,741, filed on Oct. 3, 2014.

(51) Int. Cl.
*H02S 30/10* (2014.01)
*F16B 5/06* (2006.01)
*H02S 40/34* (2014.01)

(52) U.S. Cl.
CPC ............ *H02S 30/10* (2014.12); *F16B 5/0685* (2013.01); *H02S 40/34* (2014.12)

(58) Field of Classification Search
CPC ........ H02S 30/10; H02S 40/34; F16B 5/0685; F24J 2/52; F24J 2/5201; F24J 2/5203; F24J 2/5205; F24J 2/5211; F24J 2/5288; F24J 2/523; F24J 2/5232; F24J 2/5233; F24J 2/5239; F24J 2/5243; F24J 2/5245; F24J 2/5249; F24J 2/525; F24J 2/5252; F24J 2/5254; F24J 2/5256; F24J 2/5258; F24J 2/526
USPC ....................................................... 52/173.3
See application file for complete search history.

(56) References Cited

U.S. PATENT DOCUMENTS

| | | | | |
|---|---|---|---|---|
| 4,371,139 A | * | 2/1983 | Clark ........................ | F24J 2/045 136/244 |
| 7,435,897 B2 | * | 10/2008 | Russell ................. | E04D 3/3608 136/244 |
| 7,849,849 B2 | * | 12/2010 | Genschorek ........... | F24J 2/5233 126/623 |

(Continued)

*Primary Examiner* — Jessica L Laux
(74) *Attorney, Agent, or Firm* — Damian Wasserbauer, Esq.; Wasserbauer Law LLC

(57) ABSTRACT

A modular mounting system for securing a photovoltaic (PV) panel to support structure and a solar array. The mounting system and method configured for flat and pitched surfaces with a minimum of components parts reducing manufacturing and installation costs. The mounting system and method in a rack mount embodiment comprises a base assembly and an elevation assembly each connecting a PV panel via a top plate and mid-clamp assembly. The mounting systems in a rail mount embodiment, the mid-clamp assembly and an end assembly are utilized to ground and secure the PV panel to the rail mount and support structure. The modular mounting system provides a ballast pan, connecting belts for connecting each base bracket to the ballast pan and each other adding rigidity to the system. The modular mounting system provides a reduction in the seismic plates utilized prevent lateral displacement from seismic activity and other environmental factors.

11 Claims, 20 Drawing Sheets

(56) References Cited

U.S. PATENT DOCUMENTS

| | | | | |
|---|---|---|---|---|
| 8,220,210 B2* | 7/2012 | Botkin | F24J 2/5211 | 126/623 |
| 8,234,824 B2* | 8/2012 | Botkin | F24J 2/5211 | 126/623 |
| 8,572,909 B2* | 11/2013 | Rivera | F24J 2/4638 | 136/251 |
| 8,695,290 B1* | 4/2014 | Kim | F24J 2/5252 | 248/225.11 |
| 8,832,938 B2* | 9/2014 | Gies | F24J 2/5239 | 29/890.033 |
| 8,893,445 B2* | 11/2014 | Yen | F16C 11/04 | 126/623 |
| 8,925,263 B2* | 1/2015 | Haddock | F24J 2/5258 | 136/251 |
| 8,950,721 B2* | 2/2015 | Kobayashi | F24J 2/5245 | 126/569 |
| 2003/0015637 A1* | 1/2003 | Liebendorfer | F24J 2/5205 | 248/237 |
| 2004/0163338 A1* | 8/2004 | Liebendorfer | F24J 2/5207 | 52/173.1 |
| 2007/0295391 A1* | 12/2007 | Lenox | F24J 2/5245 | 136/251 |
| 2009/0025314 A1* | 1/2009 | Komamine | F24J 2/5207 | 52/173.3 |
| 2011/0088740 A1* | 4/2011 | Mittan | F24J 2/5205 | 136/244 |
| 2011/0138585 A1* | 6/2011 | Kmita | F24J 2/5258 | 24/522 |
| 2011/0214368 A1* | 9/2011 | Haddock | F24J 2/5249 | 52/173.3 |
| 2011/0314752 A1* | 12/2011 | Meier | F24J 2/5211 | 52/173.3 |
| 2012/0017526 A1* | 1/2012 | Eide | F24J 2/5207 | 52/173.3 |
| 2012/0036799 A1* | 2/2012 | Kneip | F24J 2/523 | 52/173.3 |
| 2012/0240489 A1* | 9/2012 | Rivera | F24J 2/4638 | 52/173.3 |
| 2012/0298188 A1* | 11/2012 | West | F24J 2/5211 | 136/251 |
| 2013/0014451 A1* | 1/2013 | Russell | E04B 1/34869 | 52/79.1 |
| 2013/0091786 A1* | 4/2013 | DuPont | F24J 2/5249 | 52/173.3 |
| 2013/0133275 A1* | 5/2013 | Bindschedler | F24J 2/5203 | 52/173.3 |
| 2013/0299655 A1* | 11/2013 | Sader | F24J 2/5205 | 248/231.9 |
| 2013/0299659 A1* | 11/2013 | Sader | F24J 2/5245 | 248/298.1 |
| 2014/0102016 A1* | 4/2014 | Hemingway | F24J 2/5256 | 52/173.3 |
| 2014/0109953 A1* | 4/2014 | Aulich | H02S 20/24 | 136/251 |
| 2014/0360111 A1* | 12/2014 | Kuan | F24J 2/5205 | 52/173.3 |
| 2015/0349700 A1* | 12/2015 | Port | H02S 20/22 | 52/173.3 |

\* cited by examiner

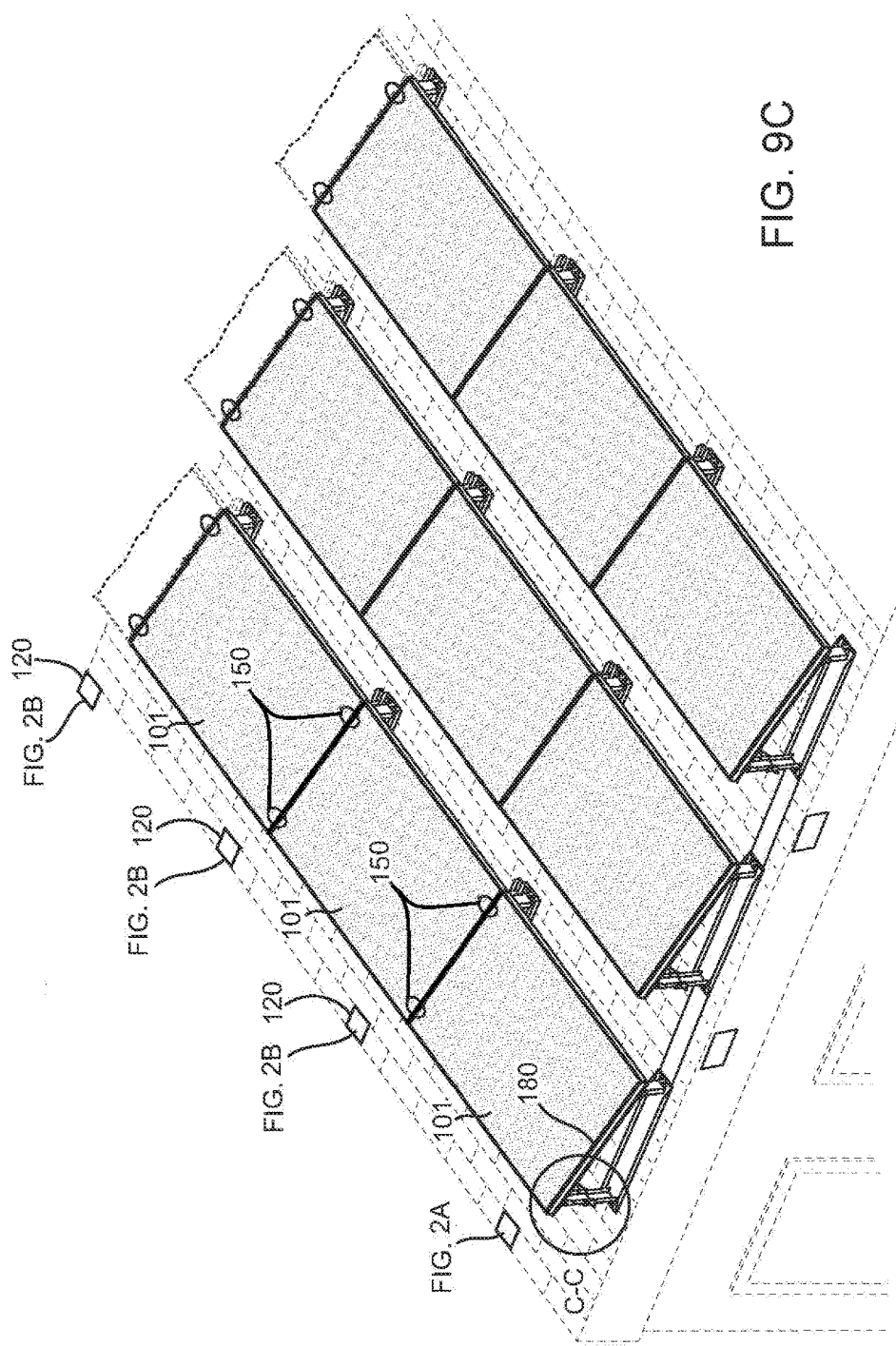

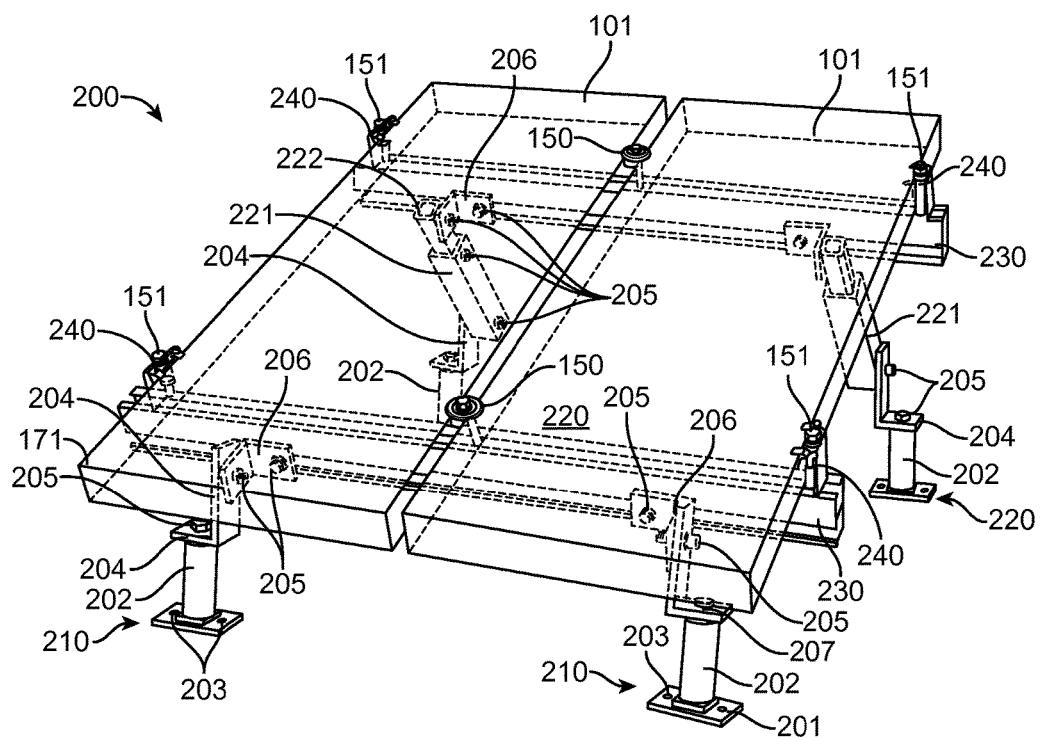
FIG. 21
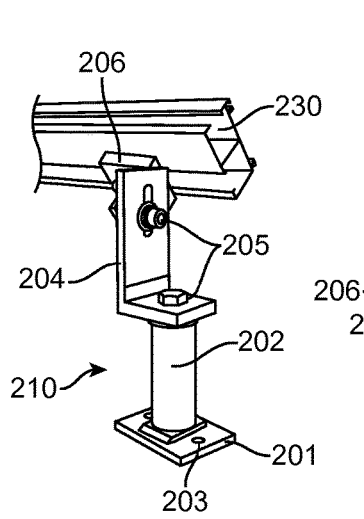
FIG. 22
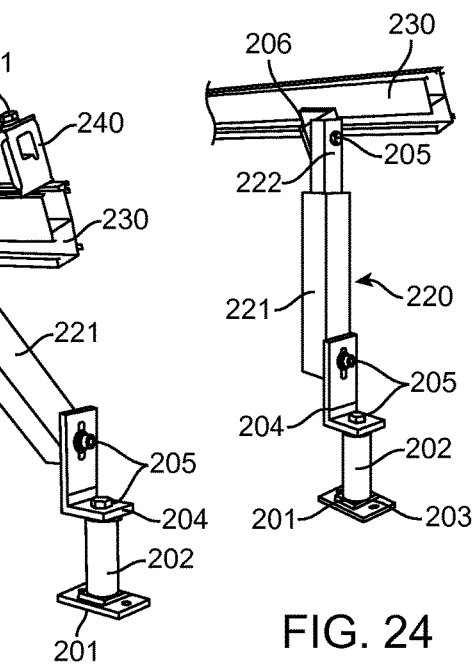
FIG. 23
FIG. 24

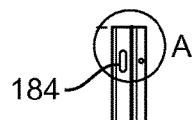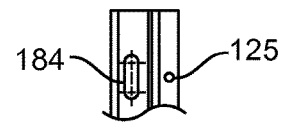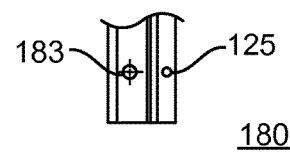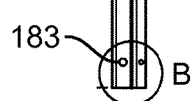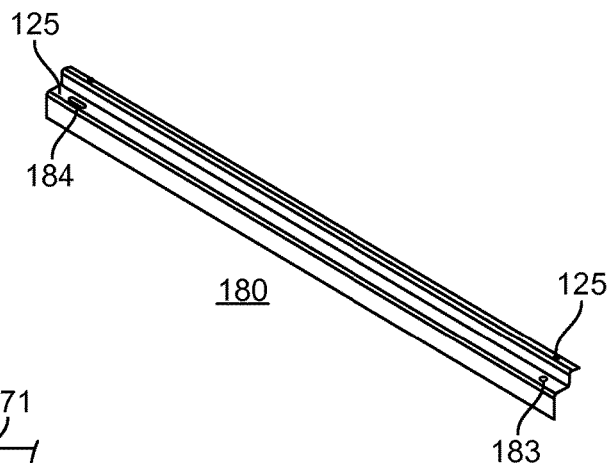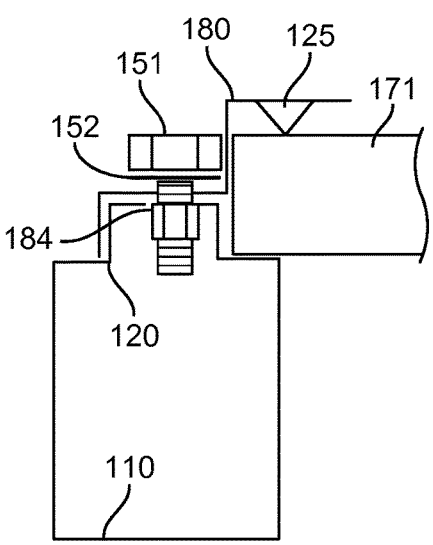
FIG. 30
FIG. 31A
FIG. 31B
FIG. 32
FIG. 33

SYSTEM AND METHOD FOR MOUNTING PV PANELS IN BRACKET AND/OR RAIL MOUNT DESIGN

This application claims the benefit of U.S. Provisional patent Application No. 62/059,741 filed Oct. 4, 2014 entitled, "Adjustable mounting, bracket and clamping system for PV Modules."

FIELD OF THE INVENTION

The present invention relates to securing a solar and/or photovoltaic (PV) panel(s) to the earth, roof or other building structure and, more particularly, to modular mounting system with improved clamp and grounding of bracket and rail mounts adjustable in angle and height so as reduce manufacturing and installation costs.

BACKGROUND OF THE INVENTION

Roof-mounted solar power systems consist of solar modules secured to frames and the utilizing roof-based mounting systems. Conventional mounting systems typically use a mounting system with numerous parts that increases the cost of manufacture and installation. Mounting systems with numerous parts require assembly resulting in greater manufacturing costs and, if configurable later, numerous parts to assemble in the field. Moreover, typical bracket and rail mount applications may not use all of the features of such complex mounting systems, for example, when mounting a singular panel, or to arrange numerous solar panels in an array, to earth, roof or other building structure. As a result, conventional mounting systems may be overbuilt for the purpose of securing photovoltaic (PV) panel(s) to the earth, roof or other building structure or, alternatively, and extended rows of a solar array.

Examples of bracket mounts in the prior art include supports formed by cutting solid lengths of metal or other supports to order, i.e. the appropriate length. Customized cutting to order of the supports fixed lengths increases the manufacturing cost, results in waste material, results and business losses should an order be canceled having no resale value, and such made to order lengths may not allow configuration during installation in the field. Certain rail mounts in the prior art have multiple parts and pieces also increase the unit manufacturing cost as well as the labor cost to assemble in the field. As a result, there is a long-felt need for a mounting system for both bracket and rail mounts of PV panels and/or solar arrays having interchangeable parts that reduce manufacturing and on-site installation costs.

Installations of PV panels and/or solar array have the PV panels oriented, based on latitude and longitude, for an optimum angle to receive direct solar energy and optimal exposure to the sun, for drainage, and other considerations. Conventional mounting systems with numerous parts allow a user to make angle adjustments through many degrees, for example, adjustments using fasteners securing the panel to the bracket or rail mounts. In certain conventional fixed-length bracket mounts and angle adjustment may be made to a bracket by bending an extended flange or by affixing (e.g. welding) an attachment plate at the desired angle to orient the installed PV panel. Accordingly, such prior art bracket mount systems have has disadvantages as such fixed length brackets may not allow configuration in the field or at the installation as well as bending and/or welding steps tend to increase the manufacturing cost. Attachment plates configured as adjustable also have disadvantages because these require a complex construction and increased the number of individual parts resulting in increased manufacturing cost and labor costs to install. Consequently, there is a long-felt need for an angle plate for PV panels that reduces manufacturing and labor costs.

SUMMARY OF THE INVENTION

It is an object of the present invention to provide a modular mounting system and method for securing a solar array and/or photovoltaic (PV) panel(s) to the earth, roof or other building structure.

It is another object of the present invention to provide a modular mounting system and method for securing a solar array and/or photovoltaic (PV) panel(s) with improved grounding clamp useful for both bracket and rail mounts with lower manufacturing and installation costs.

It is yet another object of the present invention to provide a modular mounting system and method of using grounding fasteners to provide a fully grounded system for the electrical connection between electrically charged PV panels and/or multiple PV panels in a solar array.

It is an object of the present invention to provide an apparatus, system and method of utilizing mid- and an end clamp assemblies for PV panels that reduces manufacturing cost, unit cost, and the time of labor to assemble and install on-site.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein:

FIGS. 9A-9F illustrate various aspects of the installations in accordance with one or more embodiment of the present invention whereby FIG. 9A illustrates a schematic view of the mid-clamp assembly arranged for securing to the top plate to secure PV panels at the midpoint between panels in a rail mount design;

FIG. 9B illustrates a schematic view of the grounding nut and mid-clamp assembly to secure PV panels at the midpoint a rail mount design in accordance with an embodiment of the present invention;

FIG. 9C illustrates a schematic view of the mid-clamp assembly for securing between PV panels in a solar array of the bracket mount design on the flat roof or other planar structure;

FIG. 9D illustrates a schematic view a schematic view of the mid-clamp assembly for securing between PV panels in a solar array of the a rail mount design on the pitched roof or other angled structure;

FIG. 9E, taken along lines C-C of FIG. 9C, illustrates a schematic view of the mounting bracket for securing an inverter 181 or other electrical equipment to a bracket mount design accordance with an embodiment of the present invention; and FIG. 9F, taken along lines D-D of FIG. 9D, illustrates a schematic view of the grounding nut assembly securing to a channel of a rail mount design in accordance with an embodiment of the present invention.

FIG. 21 illustrates schematic, perspective view of a rail mount in accordance with an embodiment of the present invention;

FIG. 22 illustrates schematic, perspective view of a base of the rail mount of the present invention;

FIG. 23 illustrates schematic, perspective view of a base and telescoping leg of the rail mount of the present invention;

FIG. 24 illustrates schematic, perspective view of a base and telescoping leg of the rail mount;

FIG. 30 illustrates top view of the grounding end plate in accordance with an embodiment of the present invention;

FIGS. 31A and 31B, taken along lines A-A and B-B of FIG. 31, illustrates top view of the grounding end plate in accordance with an embodiment of the present invention;

FIG. 32 illustrates schematic side view of grounding end plate in accordance with an embodiment of the present invention;

FIG. 33 illustrates perspective view illustrating of the grounding end plate of the present invention.

DESCRIPTION OF THE EMBODIMENTS

Figure 1A:
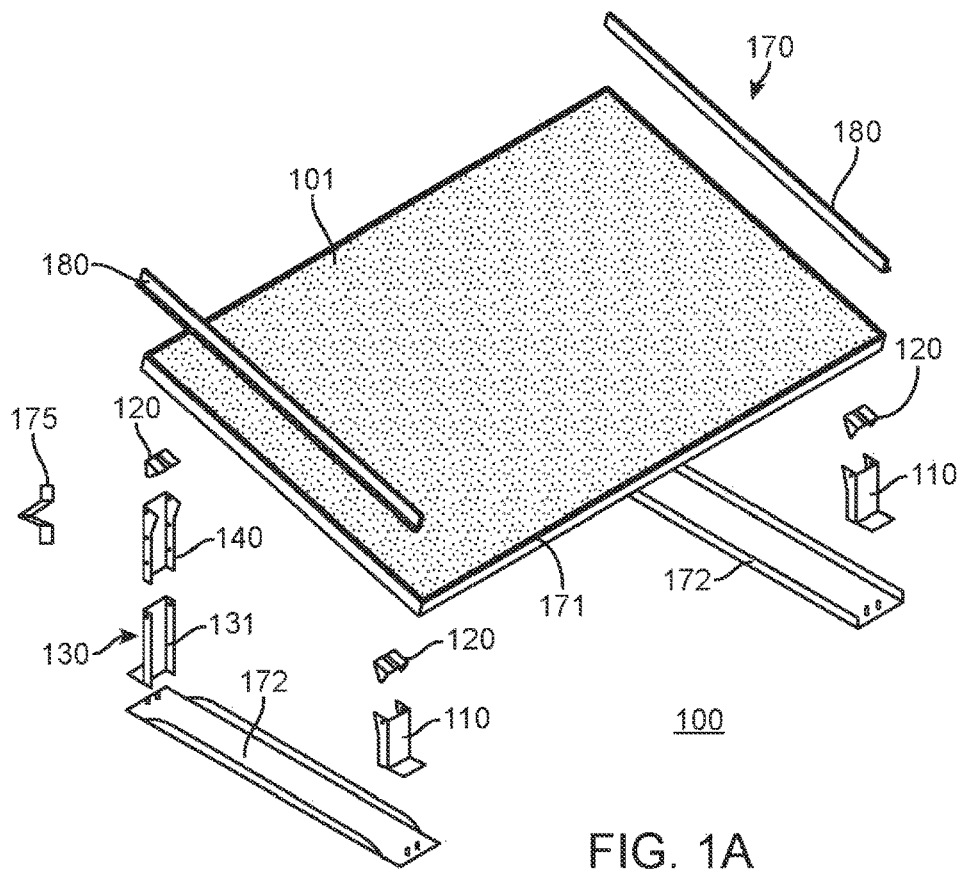
FIGS. 1A and 1B illustrate schematic, expanded, perspective views of the mounting apparatus, system, and method in accordance with an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "Photovoltaic" or "PV" refers or "Solar panel" refers to a photovoltaic module, a solar thermal energy panel, or to a set of solar photovoltaic (PV) modules electrically connected and mounted on a supporting structure. A solar "photovoltaic module" is composed of individual PV solar cells electrically connected, mounted on a supporting structure and arranged in an aluminum frame having glass on the front. A "solar array" is typically composed of a solar panel with 24 solar modules.

As used herein the term "bracket" refers to a structural member for holding and/or attaching (something) by means of a support, for example, perpendicular, right-angled, or other support arrangement.

As used herein the term "flange" refers to an edge that sticks out from something (e.g. a bracket) and is used for strength, for guiding, or for attachment to another object (e.g. a roof or PV panel).

As used herein the term "splice bar" refers to a metal bar that is bolted to the ends of two rails to join them together in a track.

As used herein the term "track" refers to a surface mount with a recess or channel for receiving a fastener (e.g. a mid-clamp and/or mid-clamp was channel nut) so as to mount a PV module(s) thereto.

As used herein the term "Grounding mid-clamp" refers to a fastener that is utilized to secure two or more PV panels in an array to the channel of a support or track with an action of clamping down on the panels and creating an effective metal to metal connection so as to electrically ground the assembly.

PV panels may be arranged in elongated arrays oriented for optimal exposure to the sun such as, for example, in square or rectangular rows. The installation of the PV panels for exposure to the sun requires adjustments to the height of the bottom and top edges of the PV panel from the support surface that eliminates shadowing between rows and creates the appropriate angle the PV Panel for. For example, the height of the bottom edge is lower than the top edge of an installed PV panel, whereby the flat rectangular panel is positioned at a desired optimal angle to the sun (i.e., for a particular longitude and latitude of the installation). Brackets may be utilized to support bottom edge at a lower height above the roof than the top edge (e.g. utilizing a bracket of a shorter length to support the bottom edge than the length of the top edge). The height adjustment also is important to configure subsequent parallel rows of PV panels in the predetermined arrangement pattern such that the "ahead of" arranged row do not shade the behind row of PV panels.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation. In addition, terms such as "first" and "second" are used herein for purposes of description and are not intended to indicate or imply relative importance or significance.

Figure 8A:
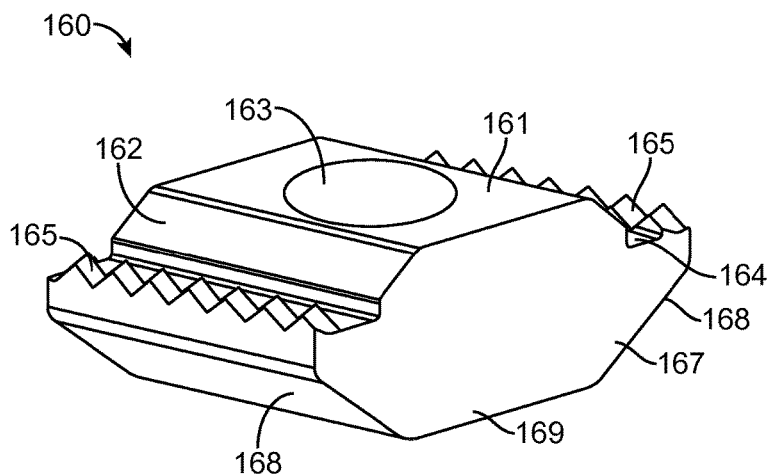
FIGS. 8A, 8B, 8C and 8D illustrate perspective, side, end, and top views, respectively, of the grounding channel nut in accordance with a rail mount design embodiment of the present invention.
Figure 8B:
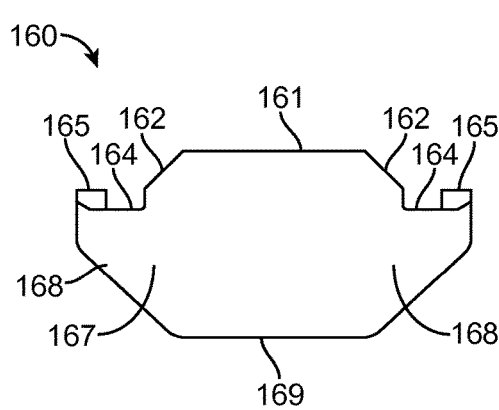
Figure 8C:
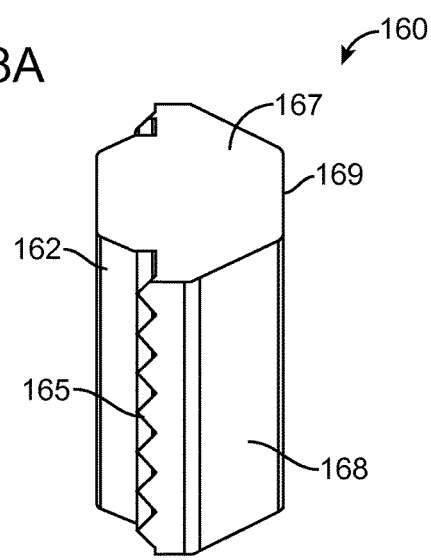
Figure 8D:
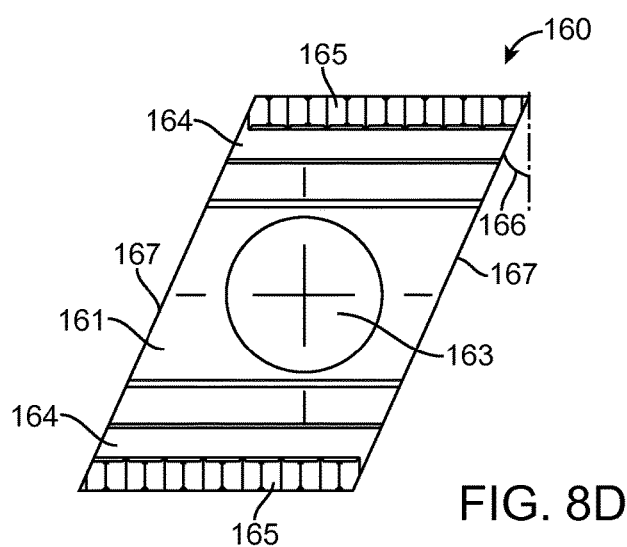
Figure 9A:
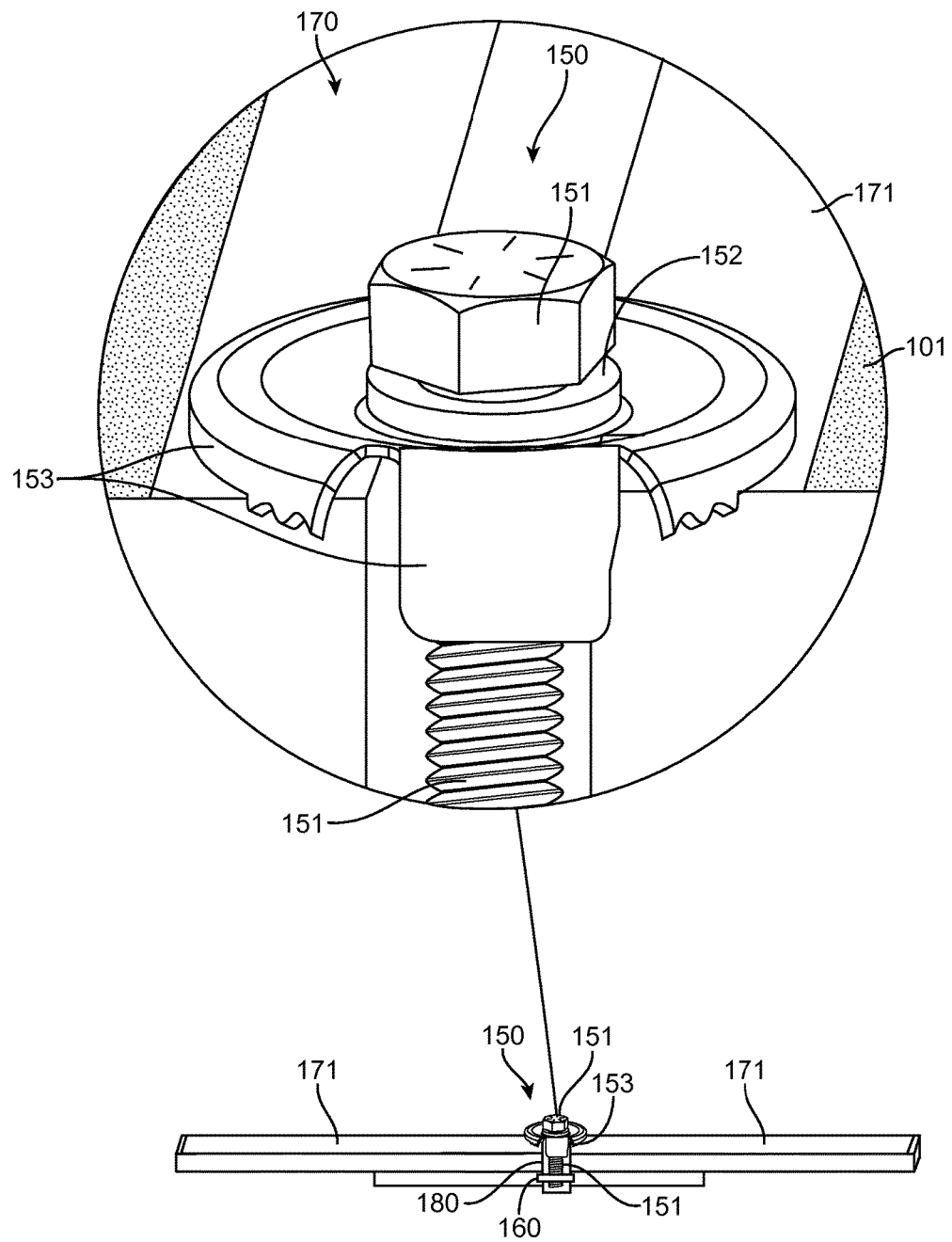
Figure 9B:
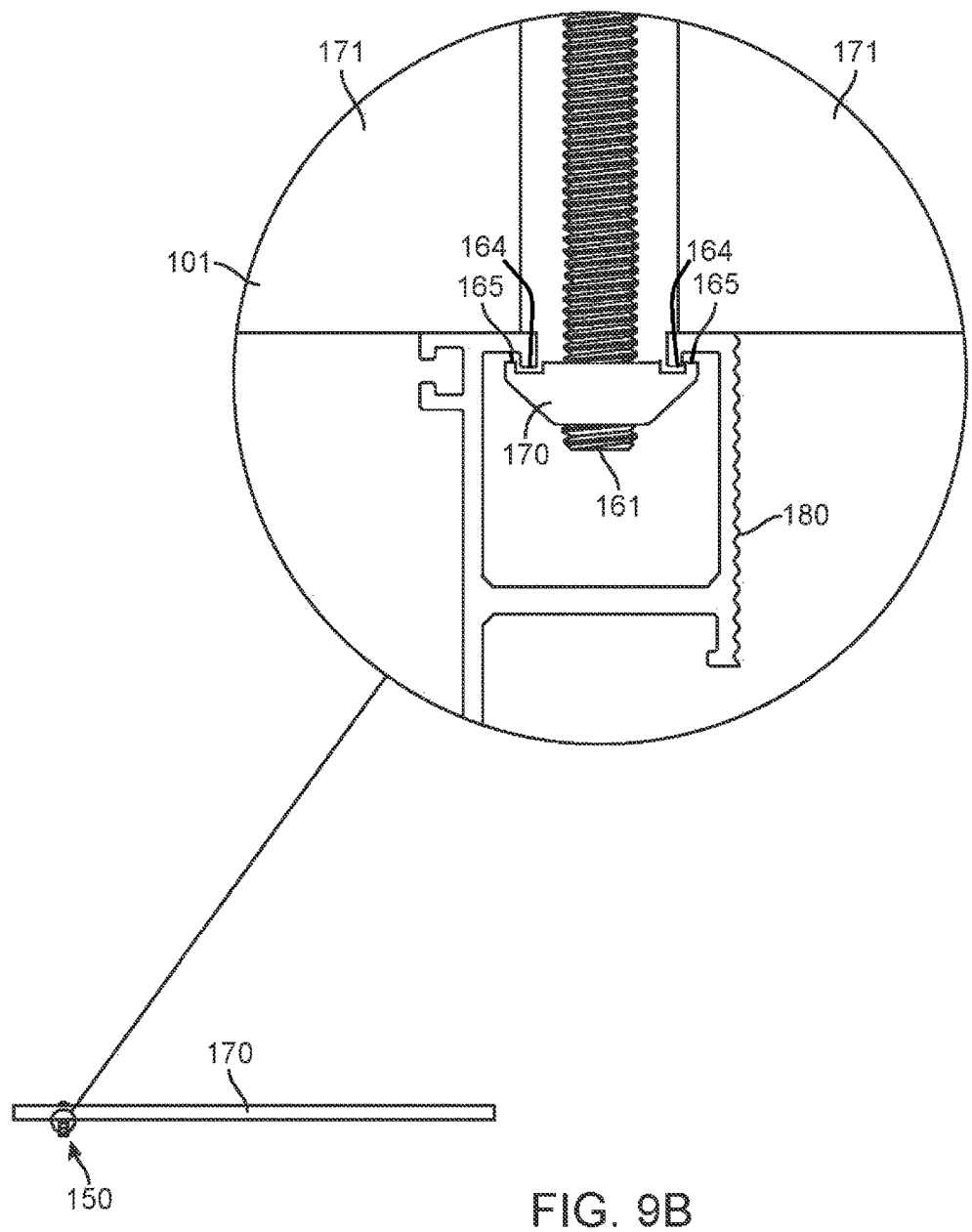
Figure 9D:
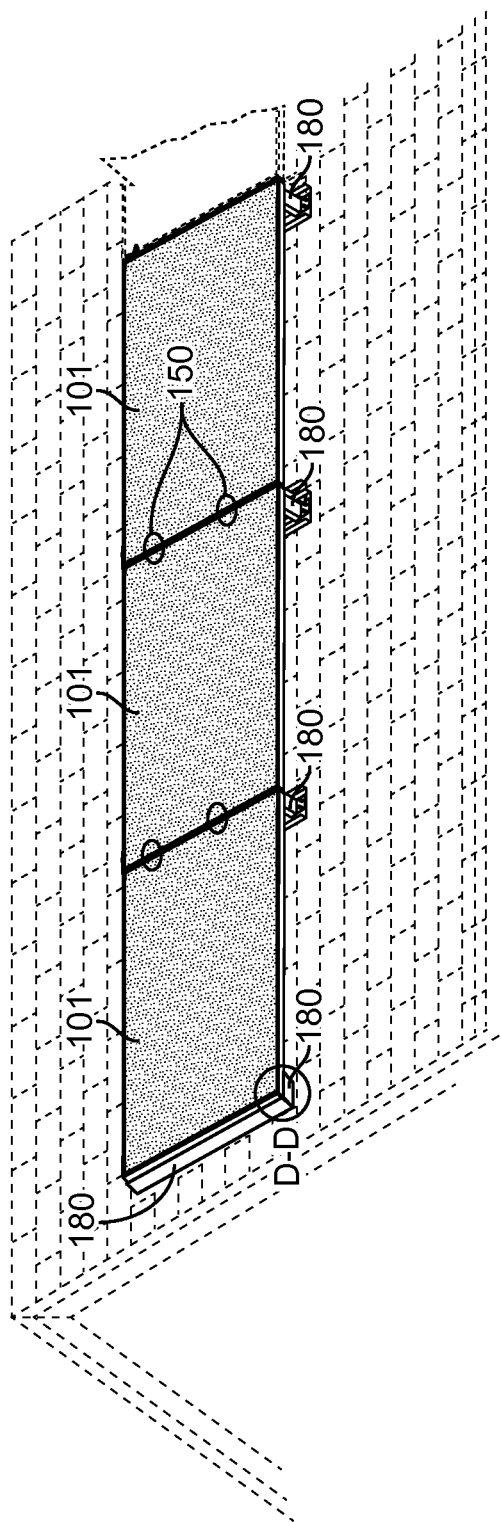
Figure 9E:
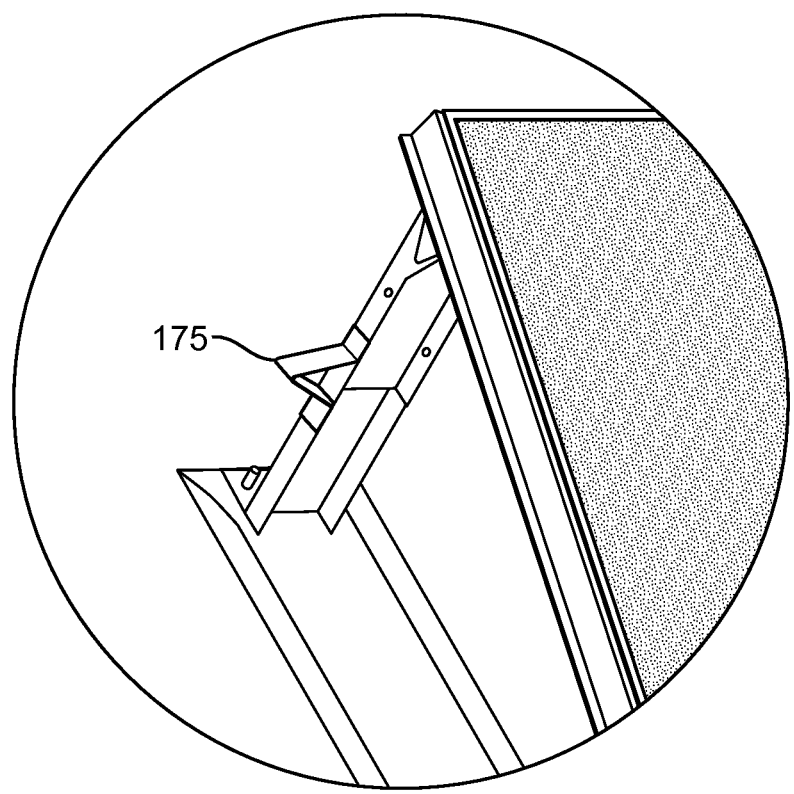
Figure 9F:
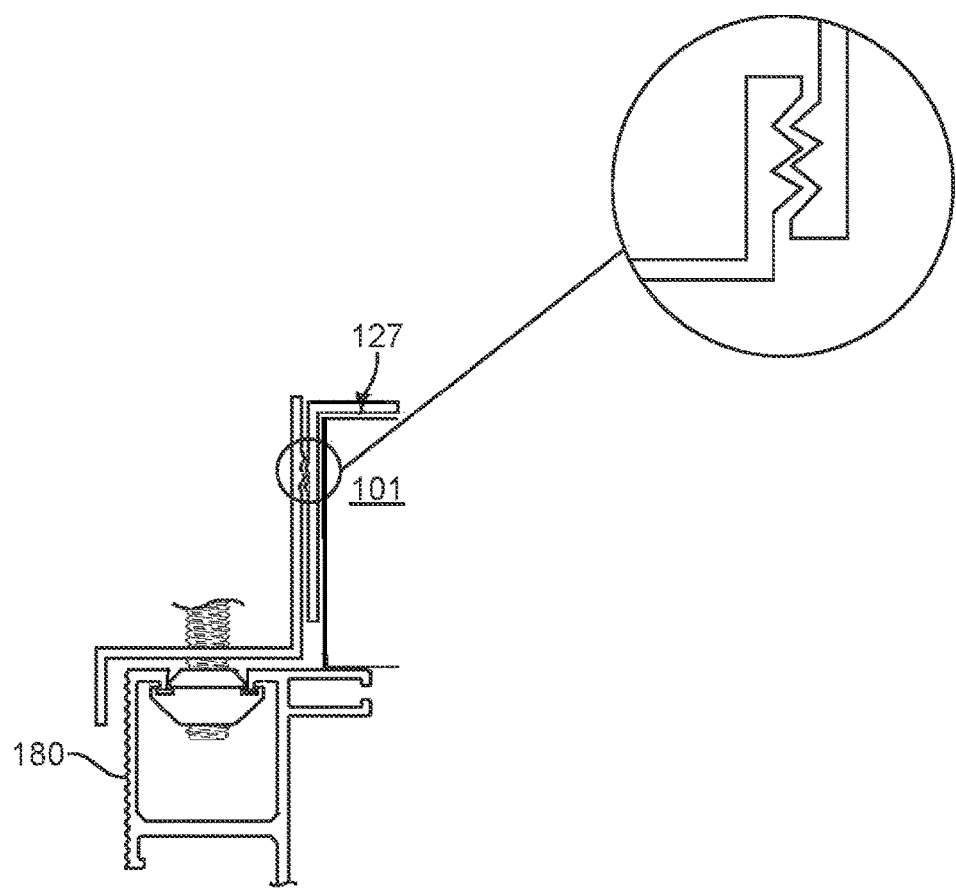

As is illustrated in FIGS. 1 through 34B, a mounting system and method 100 is shown in accordance with an embodiment of the present invention in a roof mounted array of PV panels 101 as shown in FIGS. 9C and 9D. The mounting system and method 100 may constructed with an improved bracket assembly with advantages in the manufacture thereof as well as simplifying installation of a solar array in the field. The mounting system and method 100 of the present invention is described in connection with a flat surface installation, for example, on a roof as is shown in FIGS. 9C and 9E. Additionally, mounting system and method 100 of the present invention is described in a pitched surface such as the bracket and rail assembly on the roof of a structure as is shown in FIGS. 9B, 9D and 9F. It should be appreciated that the mid-clamp assembly is utilized in both bracket and rail mounting systems hereof. Moreover, the mounting system and method 100 of the present invention is useful in other installations and surfaces such as, for example, suspended structures and earth anchored installations. As a result, the one or more embodiments illustrating the elements and structures of the present invention should be not be limited to a particular installation as the present invention is adaptable to most known PV panel and solar array designs.

Figure 1B:
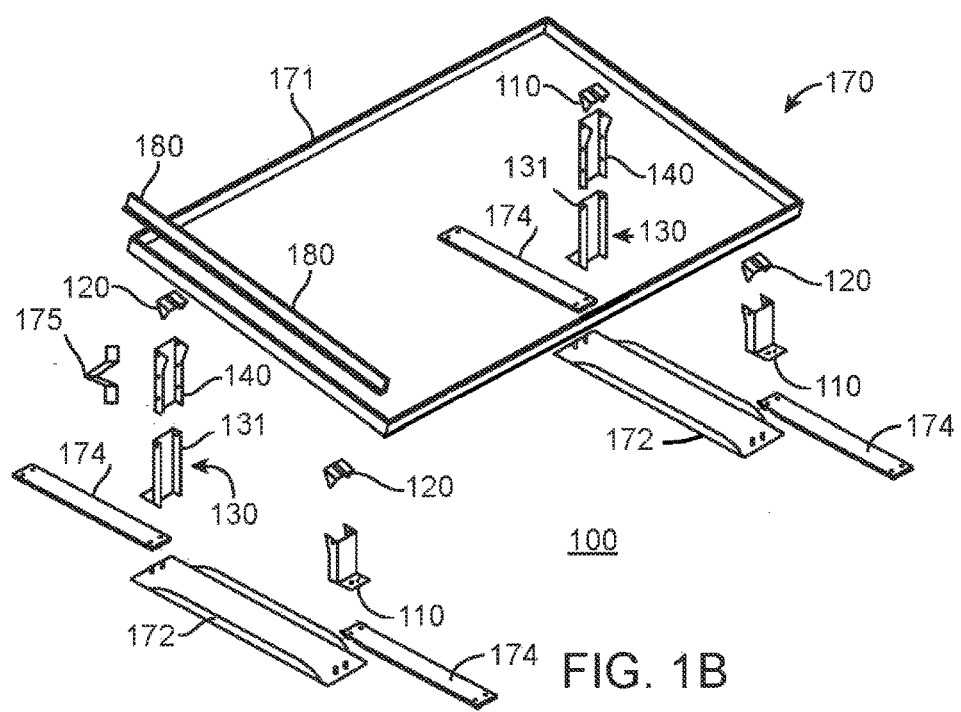
Figure 7A:
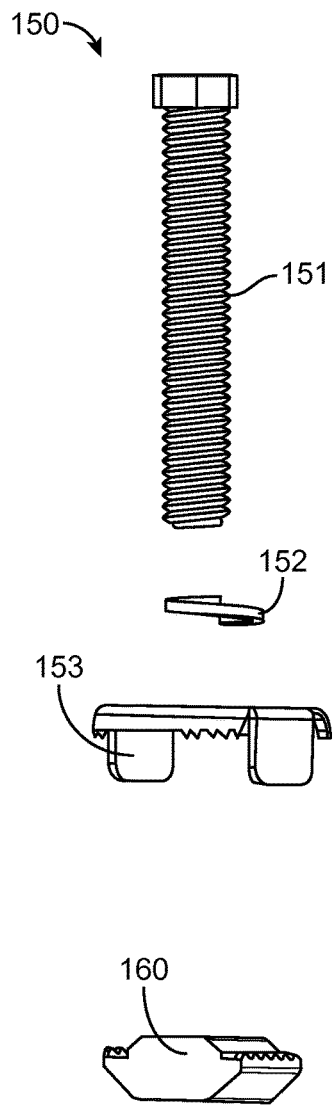
FIGS. 7A and 7B illustrates a side expanded view and a perspective view, respectively, of the mid-clamp in accordance with an embodiment of the present invention.
Figure 7B:
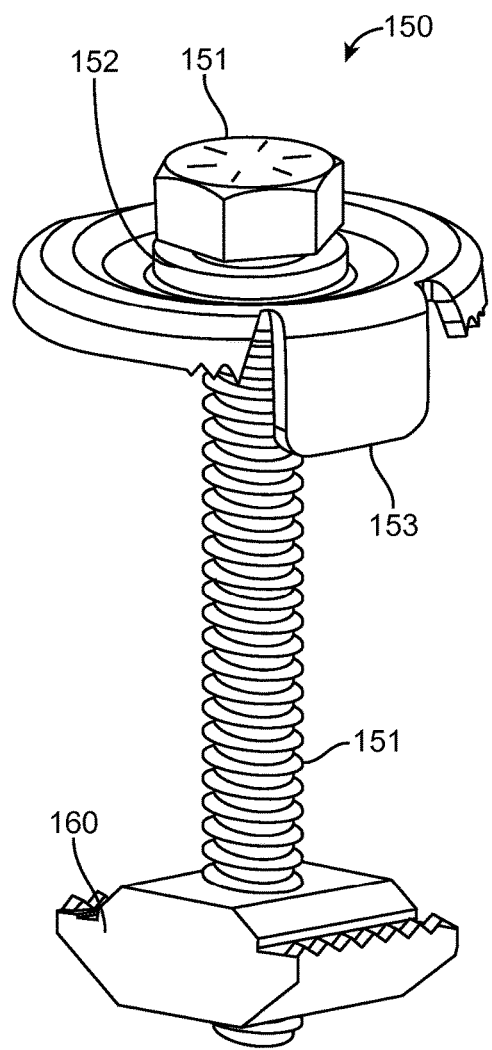

Referring to FIGS. 1A and 1B, the mounting system 100 can be formed modular as rack mount base assembly 110 with a base bracket 111, operably connected to a top plate 120 for supporting a front edge or portion of the PV panel 101. The top plate 120 further operably couples to an elevation assembly 130 for supporting the rear edge or portion of the PV panel 101. The elevation assembly 130 comprises an interleave bracket 140 operably coupled at openings 146, 147 in side portions 141 with openings 135 of a base bracket 131, or alternatively, at openings 113 of the base bracket 110. A grounding mid-clamp assembly 150 is configured to secure the frame of the PV panel 101 to raised portion 122 of the top plate 120 as illustrated in FIGS. 7A and 7B. In this embodiment, the grounding mid-clamp assembly 150 comprises bolt 151, washer 152, tabbed-spacer 153 operably connecting to the raised portion of the top plate 120 to secure PV panels 101. In a rail mount design, the bolt 151, washer 152 and tabbed-spacer 153 operably connect to a channel nut 160 and secure between side portions of the PV panels 101. In a rail mount design, a panel support assembly 170 (when the PV Panel is provided without a frame), and end plate 180 used on the edge of the solar array as shown in FIGS. 1A and 9C. The PV panel 101 generally is secured in the panel support assembly 170 and positioned in the appropriate predetermined orientation 104 of angle 105 for a particular location (i.e. latitude and longitude). The PV panel 101 also is secured in the panel support assembly 170 and positioned in the appropriate predetermined height 106 orientation 104 also forming the appropriate angle for a particular location. FIGS. 1A and 1B illustrate the method and mounting system 100 in an expanded view configured to secure the PV panel 101 to various roof constructions as shown in FIGS. 9C and 9D.

Referring to FIGS. 1A and 1B, the mounting system 100 is configured to use the existing panel frame 171 of the PV panel 101, or alternatively to use a panel frame 171 for custom shaped PV panels. The panel frame 171 is configured to hold the PV module, glass and the support circuitry in a plane so as to absorb solar energy. An important feature of the design of the mounting system 100 according to the present invention is the grounding of the panel frame 171 by way of the grounding mid-clamp assembly 150. In a racking system, the grounding mid-clamp assembly 150 also may secure and ground the panel frame 171 to the end plate 180. It is also important that the panel frame 171 remains secured during strong winds, seismic events and other environmental conditions (e.g. under loads (heavy snow) without breakage or bending). The mounting system 100 is configured to utilize advantageously the mid-clamp assembly 150 for improved securing of the PV panel 101 to the elements of the base bracket 110, top plate 120, elevation assembly 130 top plate 120, and interleave bracket 140 to the structure (e.g. flat or pitched roof) or surface (e.g. earth).

Figure 13:
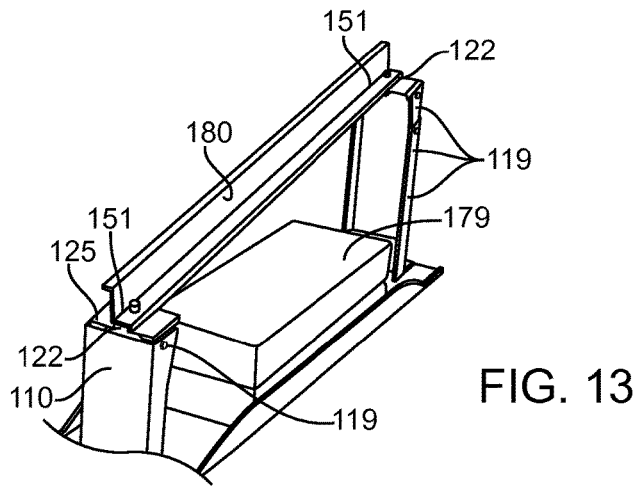
FIG. 13 illustrates schematic, perspective view of the ballast tray in the present invention bracket mount design.

Also as shown in FIGS. 1A and 1B, the mounting system 100 can be configured with a ballast pan or tray 172 for ballast 179 (FIG. 13) for preventing movement of the panel frame 171 during strong winds, seismic events and other environmental conditions. For example, the ballast pan 172 may be formed to hold elements of a ballast system, for example, ballast 179 in the form of cement blocks of appropriate size and weight for prevention of movement (e.g. due to wind forces) as shown in FIG. 13. The ballast pan 172 reduces and/or prevents direct contact between roofing and cement ballast 179 that may potentially damage the integrity of the roof as well as maintaining a roof manufacturer's warranty. Accordingly, the mounting system 100 integral ballast pan 172 solves problems affecting solar panel installations from during strong winds, seismic events and other environmental factors as well as allowing deflection of the pan under heavy snow loads without breakage or bending.

Figure 14:
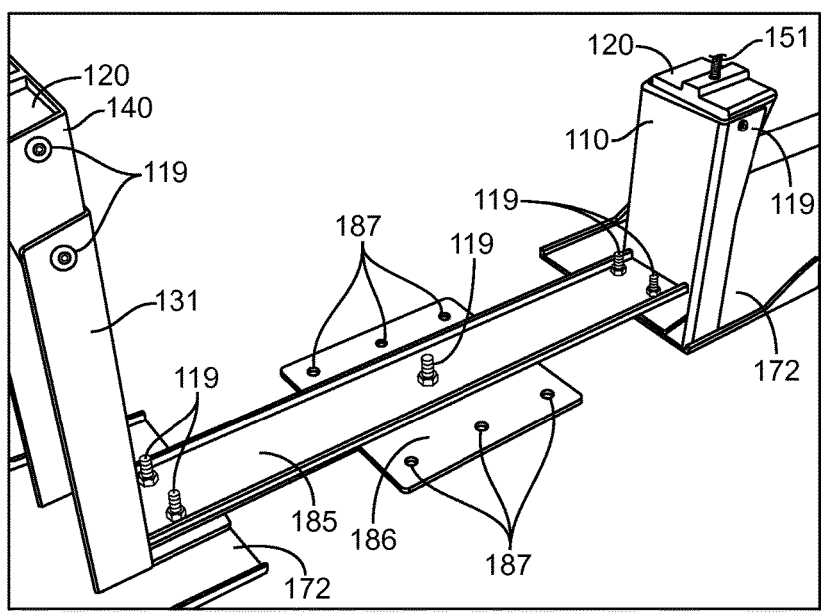
FIG. 14 illustrates schematic, perspective view of the solar strap in the present invention bracket mount design.
Figure 15:
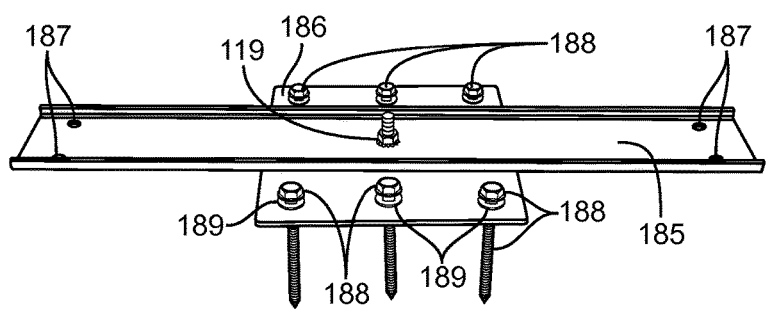
FIG. 15 illustrates schematic, perspective view of the solar strap in the bracket mount design.

As shown in FIGS. 13 through 15, the mounting system 100 can be configured with a connect belt 185 structural component functioning to connect each bracket mount to each other and add rigidity and grounding fully the system. The connect belt 185 is utilized for connecting rows of PV panels 101 in a solar array to ground, providing structural connection for environmental factors, and to efficiently create solar arrays giving the array a predetermined orientation so as to eliminate shadows for height given a predetermined length. As shown in FIGS. 14 and 15, the connect belt 185 may be formed in and elongated panel shape. connection belt formed The connect belt 185 can be configured to attach to adjacent ballast trays 172 and to a seismic plate 186 utilizing a plurality of holes 187 formed at a midpoint and ends in the elongated panel shape thereof. The ballast tray 172 and the connect belt 185 may be secured together by fasteners 119 to retain rigidity and grounding fully the system for flat roof and/or structure installations.

Similarly, the seismic plate 186 prevents lateral displacement from seismic activity and may be secured to the connect belt 185 via fastener 119. The seismic plate 186 may be configured to attach to a stud or other structural element of a roof utilizing fasteners 188 and lock washers 189. As the connection belt 185 secures to the base assembly 110 of one row in a solar array and the elevation assembly 130 in an adjacent row of the solar array, only one seismic plate 186 will be required reducing the number seismic plates by fifty-percent 50% which is an improvement over the art as typically seismic plates are located at the support, for example, located underneath the base assembly 110. Consequently, the connect belt 185 of the mounting system and method 100 advantageously provides a secure connection to the structure to withstand environmental conditions, provides grounding of the overall bracket and/or rail mount design of the mounting system 100, and the predetermined spacing between rows in a solar panel array, which is an improvement over conventional systems.

Referring to FIGS. 1A and 1B, the mounting system 100 can be formed with an equipment mount 175. The equipment mount 175 connects necessary solar panel equipment to the mounting systems 100 so as to continue building the predetermined arrangement 102 of one or more PV panels 101 in the system 100. For example, according to FIGS. 1A and 1B, an inverter 181 and any wiring 182 may be required for each solar panel and may be located at any bracket (e.g. on a rear bracket under the 10 degree tilt or orientation). Conventional systems may not provide equipment mounts for PV panel inverters, micro-inverters, optimizers, wire management, combiner boxes, and other electrical equipment 181. In such installations, problems occur as the inverter and other types of electrical equipment may become dislodged and/or disconnected from the PV panel 101 during strong winds, seismic events and other environmental conditions. Consequently, the design of the mounting system 100 according to an embodiment of the present invention provides an equipment mount 175 to secure and support advantageously inverters and other electronic equipment that overcomes the disadvantages of conventional systems.

Referring to FIGS. 2A-2B through 5A-5B, the mounting system 100 supporting members advantageously can be formed from three (3) main elements according to an embodiment of the present invention. According to an embodiment of the present invention, a front edge of the PV panel 101 may be supported by two elements: a base bracket 110 and a top plate 120 as is shown in FIGS. 1A, 1B, 2A, 2B, and 3. Similarly, a rear edge of the PV panel 101 may be supported by the elevation assembly 130 consisting essentially of three elements: a base bracket 110, a top plate 120, and the interleave bracket 140 as is shown in FIGS. 1A through 5B, including alternative embodiments. Finally, an end plate 180 may be used for grounding the terminating edges of the panel frame 171 of a particular PV panel 101 at each end of a row in a solar array, or alternatively for a single frame 171 of a PV panel 101 supported by the mounting system 100.

Referring to FIGS. 30-33, the end plate 180 can be configured for grounding, for example, as an elongated bar with bent angles having spikes 125, hole 183 and slot 184 at each end, respectively. The spikes 125 are utilized for grounding the frame 171. The hole 183 and the slot 184 may be secured to a top plate 120 using a fastener 151 and washer 152, coupled to the threaded hole 123 of a top plate 120. The hole 183 is positioned adjacent the spike 125 such that tightening the fastener bold 151 exerts sufficient force to drive the spike 125 into the frame 171 as shown in more detail FIG. 31B. Similarly, the slot 184 allows for finer adjustments relative to the frame 171. The slot 184 is positioned adjacent the spike 125 such that tightening the fastener bold 151 exerts sufficient force to drive the spike 125 into the frame 171 as shown in more detail FIGS. 31A and 33. In this manner, the end plate 180 may be positioned and secured to the frame 171 in a bracket mount design to provide grounding as is shown in FIG. 33. Alternatively, the grounding end plate 180 may be to positioned and secured to the frame 171 in a rail mount design using the mid-clamp assembly 150 coordinating with the channel nut assembly 160 in a track 230 of a rail mount 200 configuration to provide grounding as is shown in FIGS. 21 and 33.

Conventional mounting systems designs may involve supports formed from numerous individual parts and/or solid lengths customized by cutting to the appropriate length for the height and angle orientation of the PV panel for the installation that have disadvantages because such fixed length brackets increase the manufacturing cost and may not allow modification during installation in the field. Furthermore, conventional elevation brackets having multiple parts and pieces increase the unit cost of manufacture as well as the labor cost to assemble in the field. In such installations, problems occur as the inverter inverters and other electrical equipment can be dislodged and/or disconnected from the PV panel 101 during strong winds, seismic events and other environmental conditions.

Figure 2A:
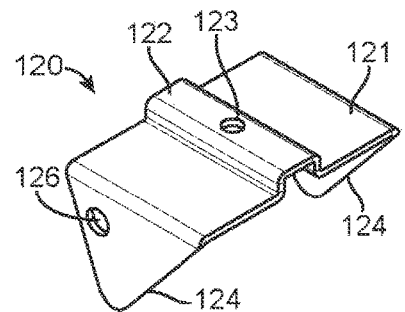
FIGS. 2A and 2B illustrate schematic, perspective views of the top plate in accordance with an embodiment of the present invention.
Figures 3A, 3B:
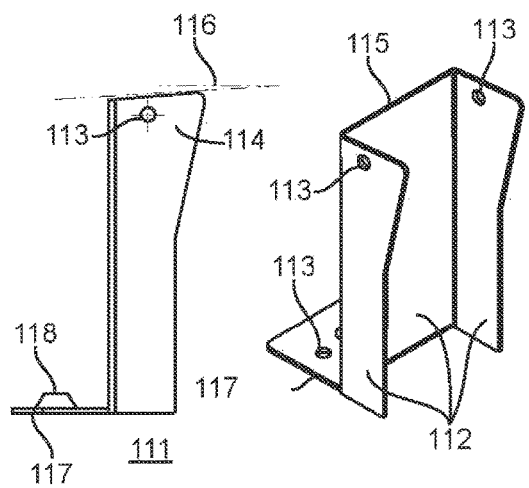
FIGS. 3A and 3B illustrate side and schematic, perspective views of the base bracket in accordance with an embodiment of the present invention.
Figures 4, 5A, 5B:
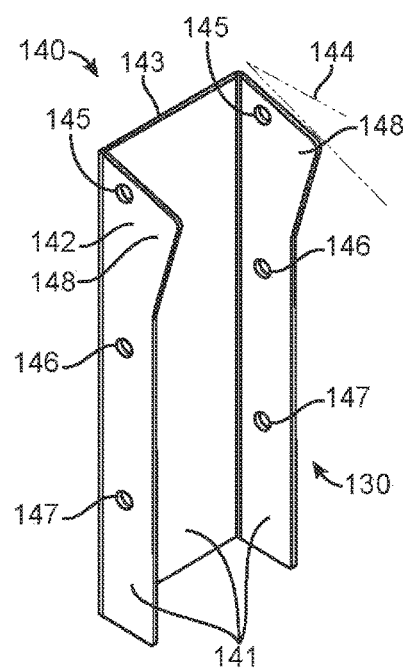
FIG. 4 illustrates a schematic, perspective view of the interleave bracket in accordance with an embodiment of the present invention.
FIGS. 5A and 5B illustrate side and schematic, perspective view of the base bracket in accordance with an embodiment of the present invention.
Figure 6A:
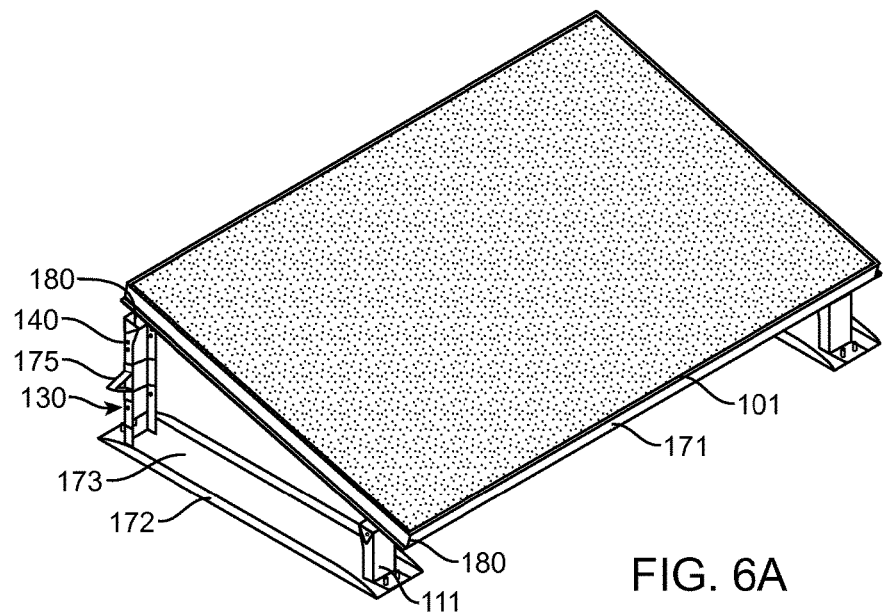
FIGS. 6A, 6B, 6C and 6D illustrates schematic perspective, top, front and side views of the mounting system and method in accordance with an embodiment of the present invention.
Figure 6B:
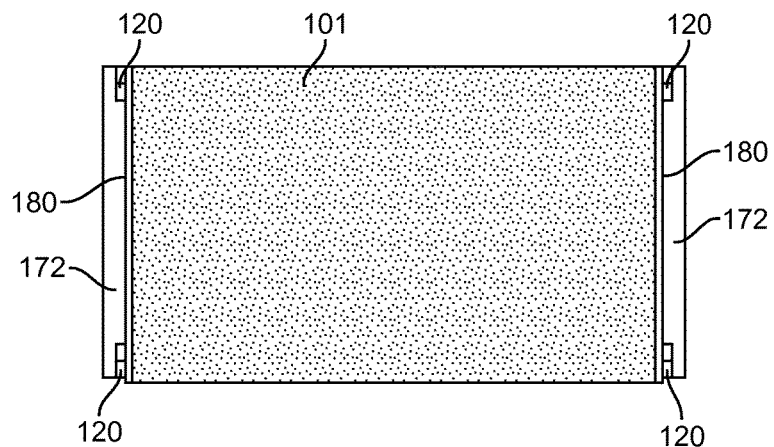
Figure 6C:
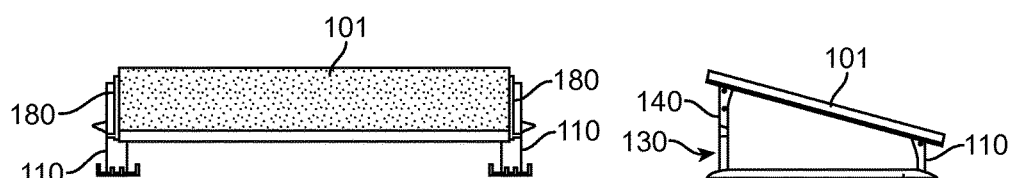
Figure 6D:
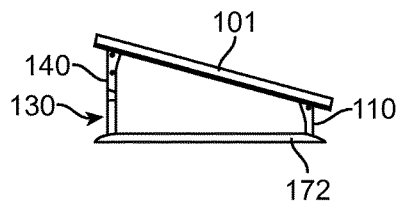

According to an embodiment of the present invention, the base and elevation assemblies 110, 130 of the mounting system 100 may be formed, assembled and thus manufactured at low-cost. For example, the forward base assembly 110 for PV panel 101 may be manufactured by securing the top plate 120 to the base bracket 111 such as, for example, aligning holes 126 and 113 and operably coupling together using fasteners 119 or other securing means e.g. rivets, pop rivets, nuts and bolts. Similarly, the elevation bracket 134 supporting the rear edge of the PV panel 101 and/or solar array may be manufactured by securing the top plate 120 to the elevation assembly 130 comprising the base bracket 131 operably coupled to the interleave bracket 140. The top plate 120 may be secured to the elevation assembly 130 by aligning holes 126 and 145 formed in flanges 124 formed from a bend disposed away from an upper surface the raised spacer 122 so as to form the downwardly extending flanges 124, shown in FIGS. 2A and 2B. Thus, aligning the openings 126 of the top plate 120 with the corresponding holes or openings 145 in the elevation assembly 130, as shown in FIG. 4, or with the holes or openings 113 of the base bracket 111 as shown in FIGS. 3A and 3B, or with the holes or opening 135 in the embodiment of the base bracket of FIGS. 5A and 5B, that provides the flanges 124 operably coupling to the interleave bracket 140 to join together using fasteners 119 or other securing means e.g. rivets, pop-rivets, nuts and bolts. Similarly, The base bracket 131 may be coupled to the interleave bracket 140 by aligning holes 135 and one of holes 146, 147 and operably coupling together using fasteners 119 or other securing means e.g. rivets, pop rivets, nuts and bolts. Consideration is made when selecting a particular hole 146 or 147 so as to establish a desired height of the top plate 120 to support the rear edge the PV panel 101, thereby creating the predetermined orientation of the PV panel 101 to the solar energy. Consequently, the mounting system 100 satisfies a long-felt need for an integral bracket design for supporting PV panels 101 that has advantages of reducing costs of manufacturing and installation in the field to overcome these disadvantages found in conventional systems.

Similarly, the mounting system 100 provides an effective, low-cost cost electrically-grounded solution for terminating each free end of a solar panel array as shown in FIGS. 9C and 9D. The end plate 180 (shown in detail in FIGS. 1A-1B and 6A-6D) may be secured to the PV panel 101 using the fastener 119 and top bracket 120 hereof to provide grounding thereof. As is shown in FIG. 9C, a bracket mount for elongated solar arrays the end plates 180 are secured by bolt 151, washer 152, tabbed-spacer 153 of the mid-clamp assembly 150 as these are fastened directly to the top piece 120 of the base assembly 110 and the elevation assembly 130 which are supporting the front and rear edges of the PV panel 101, respectively. It should be appreciated that bracket systems typically are arranged on earth and/or relatively flat surfaces such as a roof as is shown in FIG. 9C. Referring to FIG. 9D according to another embodiment of the present invention, a bracket system uses the end plates 180 secured to the track by the assembly 150 consisting essentially of the bolt 151, washer 152, tabbed-spacer 153, and channel nut 160 as shown in FIGS. 7A-7B, 9B, 9C and 9F. It is to be appreciated that the bracket system configuration of the present invention is used on pitched roofs, walls and/or surfaces as is shown in FIG. 9D.

Referring again to FIGS. 7A-7B, the mid-clamp assembly 150 when disposed between PV panels 101 advantageously couples the mounting system 100 fully to ground as shown in FIGS. 9C-9D, which is an improvement over conventional systems. The mid-clamp assembly 150 is adaptable between both bracket and rail mount designs. In a bracket mount design, the mid-clamp assembly 150 bolts directly to the top plate 120 without use of the channel nut assembly 160. In bracket mount design, mounting system 100 grounds by the serrated teeth of the tabbed-spacer 153 forming a ground-based connection with the PV panel 101 as these are fastened securing the panel to the base and elevation assemblies 110, 130. In bracket mount design, the full mid-clamp assembly 150 is used as the teeth 165 of the channel nut 160 directly engage the track forming a ground-based connection with the PV panel as these are fastened securing the panel to the end plate 180, for example, as is shown in FIGS. 7A-7B, 8A-8D. Accordingly, in operation two mid-clamp assemblies 150 are used to secure the end plate 180 to a PV panel 101 or multiple PV panels 101 in the solar array as is shown in FIGS. 9C and 9D. It should also be appreciated that, according to an embodiment of the present invention, or more a grounding mid-clamp assembly 150 may be used between PV the panels 101 in a solar array. For example, in a bracket mount system, two mid-clamp assemblies 150 are used to secure to top plates 120 supporting the front and rear edges of the PV panel 101. In a bracket system, the mounting system 100 utilizes the channel nut assembly 160 having sufficient strength and grounding such that one mid-clamp assembly 150 and channel nut 160 may be used between PV panels 101 as shown in FIGS. 9B and 9D. The mounting system and method 100 advantageously provides full grounding of all PV panels 101 in the solar array with sufficient hold to withstand environmental factors and conditions.

As is illustrated in FIG. 9C, while only one grounding mid-clamp assembly 150 may be used between PV panels 101 at mid-points and along an array, two grounding mid-clamp assemblies 150 are needed at the end of the array as these secure the end plates 180 formed elongated that can be arranged on and along the entire edge of the PV panel 101 and secured by clamps at the upper and lower edges of the PV panel 101. Accordingly, the mounting system 100 of the present invention utilizes less component parts thereby reducing costs of manufacturing and installation time which is an improvement over conventional systems. According to the embodiments of the present invention, the two-piece and three-piece construction design of the bracket mount of the mounting system 100 advantageously reduces manufacturing costs such as, for example, machining costs (i.e. bending, drilling of holes, etc.) the number of parts to be manufactured, inventory requirements, assembly costs (i.e. factory labor cost) and other costs.

Referring to FIGS. 1A-1B, 2A-2B and 3, the manufacture of the base assembly 110 may be formed by operably coupling the top plate 120 to the base bracket 111 at an upper edge 115, for example, by joining the top plate 120 to the base bracket 111 using fasteners 119 such as one or more rivet(s) or by aligning holes 113 on bracket 111 and holes 126 on plate 120 for passing there-through a bolt secured in place a nut. The upper edge 115 of the base bracket 111 may be formed at a predetermined angle 116 (e.g. 5, 10, 15 degrees) as shown in FIG. 3A. The angle 116 of the base bracket 111 supports the top plate 120 and the PV panel 101 at the predetermined angle 116 (e.g. 5, 10, 15 degrees) of a particular location for optimum solar exposure to solar energy.

The base assembly 110 also can be formed with an upper surface having additional material 114 (shown in FIGS. 3A-3B) to provide structural support for the top plate 120 and strength under environmental conditions. In an alternative embodiment, the interleave bracket 140 is provided with additional material 148 and the base bracket 131 may be formed without the additional material 114, 148, while it is appreciated that the base bracket 111 may be used nonetheless in the situation. The interleave bracket 140 can be configured with the additional material 148 to provide additional support for the top plate 120 and strength under environmental conditions as is shown in FIG. 4. In this alternative embodiment, the base bracket 131 is used for establishing height and other adjustment factors supporting the rear edge of the PV panel 101 as is shown in FIGS. 5A-5B.

The base bracket 111 can be manufactured from sheet metal utilizing punch-press or other techniques in a pattern for the base bracket 111 with additional material 114 to provide additional structural support and (2) the angle 116 formed at the upper edge 115. Further manufacturing of the base bracket(s) 111, 131 consists essentially of drilling holes 113, forming a conical hole 118 by counter-punch and bending the metal sheet into side portions 112 (i.e. front, left, right sides) and a bottom flange 117. The one or more holes 113 may be formed and located at predetermined locations for securing the top plate 120 to the base bracket 111 to form the base assembly 110 as well as securing the top plate 120 to the interleave to the elevation assembly 130. The base bracket 111 can have holes 113 located on an upper edge 115 to secure the top plate 120 at a predetermined angle 116 (e.g. 5, 10, 15 degrees). The base bracket 111 can have holes 113 located on a flange 117 for securing to another structure such as, for example, to posts integral to the ballast pan 172 (see, e.g. FIGS. 1A and 1B) for securing to the roof 103 through the conical hole 118. Accordingly, manufacturing costs, from inventory to assembly, can be reduced by the two element construction of the base assembly 110 according to an embodiment of the present invention.

Referring to FIGS. 2A-2B, 4 and 5A-5B, the elevation assembly 130 for supporting a rear edge of the PV panel 101 (see, e.g. FIGS. 1A and 1B) can be configured from three elements: a base bracket 131, a top plate 120, and an interleave bracket 140. The top plate 120 is secured to the interleave bracket 140 at an upper edge 143. The predetermined angle 144 (e.g. 5, 10, 15 degrees) can be formed by passing a bolt through holes 145 on bracket 140 and holes 126 (e.g. configured to set at 5, 10, 15 degrees) on plate 120. As above, the base bracket 131 can be manufactured from bending a single metal sheet into side portions 132 (i.e. front, left, right sides) and a bottom flange 133. The sheet metal pattern may be punch-press-formed for the base bracket 131 with (1) additional material 148 to provide additional structural support and (2) the angle 144 formed at the upper edge 142.

Referring to FIGS. 5A and 5B, the base bracket 131 can have one or more holes 135 located at an upper edge 136. The base bracket 131 can have holes 135, upper edge of side portion 132 for securing the interleave bracket 140. The base bracket 131 can have holes 135 located on a flange 134 for securing to another structure such as, for example, to posts integral to the ballast pan 172 (see, e.g. FIGS. 1A and 1B) for securing to the roof 103 through the conical hole. Similar to FIG. 3, the base bracket 131 can have holes 135 located on an upper edge 136 to secure the top plate 120 at a predetermined angle (e.g. 5, 10, 15 degrees) if the height of base bracket 131 is suitable. Otherwise, the height may be formed by securing the interleave bracket 140 to the base bracket 131 via aligning the holes 135 located on the upper edge 136 two the one or more holes 146, 147 on the side flange(s) 141 and securely fastening and/or operably coupling together these two elements of the assembly.

Similarly, the base bracket 131 can be manufactured from sheet metal utilizing punch-press or other techniques using a pattern for the base bracket 131 without the additional material 114 to provide additional structural support. Further manufacturing of the base bracket 131 consists essentially of drilling one or more holes 135, forming a conical hole 134 by counter-punch, and bending the metal sheet into side portions 132 (i.e. front, left, right sides) and a bottom flange 133. The one or more holes 135 may be formed and located at predetermined locations for securing the top plate 120 to the base bracket 131. The one or more holes 145, 146, 147 of the interleave bracket 140 may be formed and located at predetermined locations for securing the top plate 120 to the interleave bracket 140 at holes 145, and the base bracket 131 two the interleave bracket 140 by selecting from the one or more holes 146, 147 and aligning with hole 135 on the base bracket 131, thereby operably coupling and joining the three elements of the top plate 120, the interleave bracket 140, and the base bracket 131 so as to form the elevation assembly 130. As has been described herein, the base bracket 131 may be formed with holes 135 located on an upper edge 136 to secure the top plate 120 at a predetermined angle 116 (e.g. 5, 10, 15 degrees). Similarly, the interleave bracket 140 may be formed with holes 145 located on an upper edge 143 to secure the top plate 120 at a predetermined angle 116 (e.g. 5, 10, 15 degrees). The base bracket 131 for the rear portion can have one or more holes 135 located on a flange 133 for securing to another structure such as, for example, to posts integral to the ballast pan 172 (see, e.g. FIGS. 1A and 1B) for securing to the roof 103 through the conical hole 134. Accordingly, manufacturing costs, from inventory to assembly, can be reduced by the two element construction of the base bracket 131 according to an embodiment of the present invention.

Referring to FIG. 4, the interleave bracket 140 may be formed with one or more holes 145, 146, 147 at predetermined locations located side portions 141 (i.e. left, right sides). The upper hole 145 is configured to secure a top plate 120 thereto. The one or more holes 146, 147 (i.e. left, right sides) are adapted to create the appropriate height for the rear edge of PV panel 101. The base bracket 131 may be operably coupled to the interleave bracket 140 by aligning the hole 135 on base bracket 131 to a selected hole 146, 147 establishes a predetermined length of the elevation assembly 130. In order to adjust the length, interleave bracket 140 slides into the base bracket 131 and hole 135 would align first with hole 147 and then hole 146 so as to adjust the height of the rear edge of PV panel 101 in the solar array. The upper angle 144 as well as the predetermined length establishes predetermined angle (e.g. 5, 10, 15 degrees) in the predetermined arrangement 102 of the solar array of PV panels 101 at a particular location (i.e., longitude and latitude) for optimal irradiation by solar energy as is shown in FIGS. 6A-6D, and 9C-9D.

Similarly, the interleave bracket 140 can be manufactured from sheet metal utilizing punch-press or other techniques using a pattern for the interleave bracket 140 with the additional material 148 portion to provide additional structural support, and angle 144 located on the upper edge 143. Further manufacturing of the interleave bracket 140 consists essentially of drilling one or more holes 145, 146, 147, and bending the metal sheet into side portions 141 (i.e. front, left, right sides). The one or more holes 145 on side portions 141 may be formed and located at predetermined locations for securing the top plate 120 to the interleave bracket 140. The one or more holes 146, 147 of the interleave bracket 140 may be formed and located at predetermined locations for securing the top plate 120 to the interleave bracket 140 at holes 145, and the base bracket 131 two the interleave bracket 140 by selecting from the one or more holes 146, 147 and aligning with hole 135 on the base bracket 131 thereby operably coupling and joining the three elements of the top plate 120, the interleave bracket 140, and the base bracket 131 so as to form the elevation assembly 130. Accordingly, manufacturing costs of the elevation bracket assembly 130 (i.e. top plate 120, base bracket 131, interleave bracket 140) for a predetermined arrangement 102 of PV panels 101 can be reduced, from inventory to assembly, can be reduced by the three-piece construction in this embodiment of the present invention. The adjustable mount plate 127 may be secured to the base bracket 110 and/or base bracket 131 according to the design.

Figure 16:
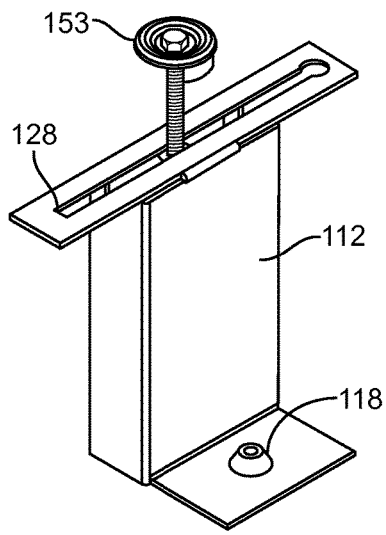
FIG. 16 illustrates schematic, perspective view of an adjustable mounting plate in accordance with an embodiment of the present invention.
Figure 17:
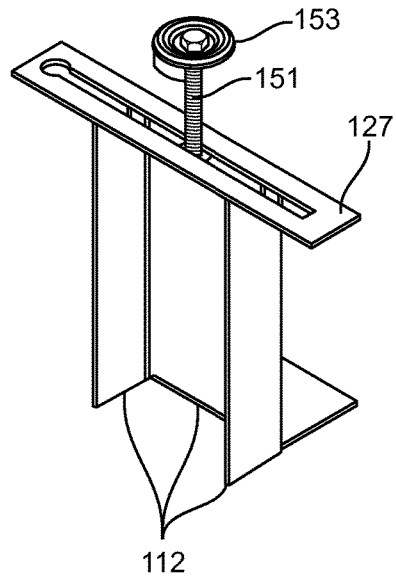
FIG. 17 illustrates schematic, perspective view of an adjustable mounting plate.
Figure 18:
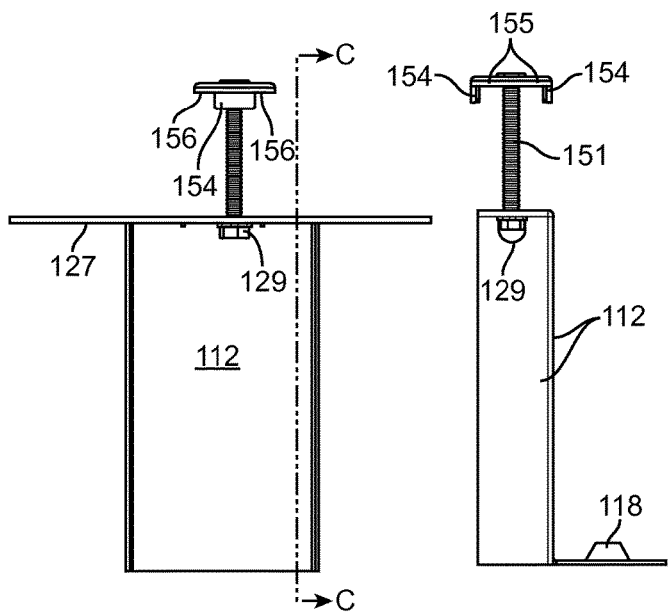
FIG. 18 illustrates rear view of the adjustable mounting plate.
Figure 19:
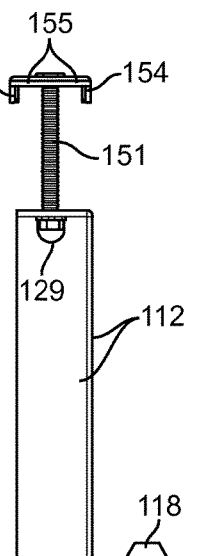
FIG. 19, taken along lines C-C of FIG. 18, illustrates a cross sectional side view an adjustable mounting plate.
Figure 20:
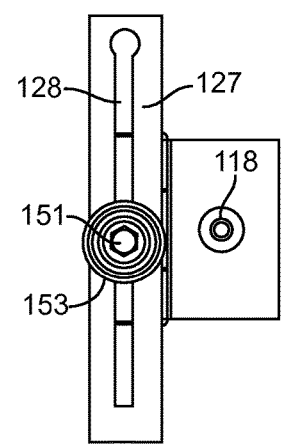
FIG. 20 illustrates top view of the adjustable mounting plate.

Referring to FIGS. 18-20, an adjustable mounting plate 127 for a bracket mount design of the present invention can provide adjustments in long solar arrays. The adjustable mounting plate 127 can be configured with a slot 128 adapted to receive the bolt 151 and grounding washer 153 and secured by a nut 129 as is shown in FIGS. 18 and 19. Referring to FIGS. 16-17 and 20, the slot 128 provides for travel of the clamping fastener relative to the frame 171 such as, for example, the tabbed grounding washer 153 and bolt 151 using threaded portion 151a to engage threads of not nut 129 and clamp the frame 171 to the mounting system 100. The adjustable mounting plate can use the base bracket 111 and secures the mounting plate 127 to an upper portion thereof. The base bracket 111 may be constructed with sides 112 and a conical hole 118 on flange of the base bracket 111. Alternatively the base bracket 131 may be utilized to secure the mounting plate 127 two an upper portion thereof. Advantageously, the mounting plate 127 with slot 128 allows for adjustments in setting the frames 171 in a long rows of one or more PV panels 101 in the solar array being installed and secured should alignment be off slightly, for example, to a roof 103 in accordance with embodiment of the mounting system 100 of the present invention.

Referring to FIGS. 6A through 6D, and 12, a PV panel 101 secured in the mounting system 100 at a predetermined angle (e.g. tilt) is illustrated. Two single base bracket assemblies 110 comprising the base bracket 111 with the top plate 120 secure at a predetermined angle 116 (e.g. 5, 10, 15 degrees) support the front edge of the PV panel 101 at a predetermined arrangement 102. Similarly, the elevation assembly 130 may be configured from the base bracket 131 with the interleave bracket 140 secured on an inner portion and top plate 120 secure at a predetermined angle 116 (e.g. 5, 10, 15 degrees) to the interleave bracket 140 provide support to the rear edge of the PV panel 101. In this manner, the predetermined arrangement 102 of one or more PV panels 101 can be secured to a roof 103 in accordance with embodiment of the mounting system 100 of the present invention.

Referring to FIGS. 7A and 7B, a grounding mid-clamp assembly 150 is illustrated according to embodiment of the present invention. The grounding mid-clamp assembly 150 comprises a bolt 151, a lock washer 152, a tabbed-spacer 153 of toothed portion 154 design, and a channel nut 160. The bolt 151 has a head and elongated threaded shaft configured to be received in a treaded hole 163 of the channel nut (e.g. tightening and loosening the tabbed-spacer 153 to a frame 171 of the PV panel 101). The bolt 151 may be formed from suitable fasteners 119 and materials such as, for example, zinc coated steel or stainless steel for environmental conditions. The lock washer 152 provides a locking action between the head of the bolt 151 and the tabbed-spacer 153 so that it does not loosen over time. The tabbed-spacer 153 of toothed portion 154 design has a tab to provide a predetermined space between PV panels 101. The tabbed-spacer 153 has a rounded shape with a toothed portion 154 and a flat portion 155 spaced apart from the tab. The toothed portion 154 is adapted to form a grounding connection with the metal frame 171 of the PV panel 101. The flat portion 155 is adapted to not form a grounding connection with the metal frame 171 of the PV panel 101 as well as to not puncture the frame or shatter the glass of the PV panel 101 upon tightening.

Referring to FIGS. 8A and 8D, the channel nut 160 can be formed with a top portion 161 configured with a ridge portion 162, hole 163, side portions 164, and serrations 165 formed at an outer edge. The channel nut 160 can be formed with opposing angled 166 face surfaces 167 forming the channel nut 160 with a generally polygonal shape that advantageously extends the edges for securing the nut 160 to the channel of a track 230 as well as to provide easy insertion when assembling in the field. Finally, the channel nut 160 can be formed with a sloping 168 base 169 thereby creating a triangular shape with one apex at the threaded hole 163 and to the serrations 165 at the edges. The triangular shape provides improved tightening and hold by directing the vector forces efficiently through the triangular shape.

Figure 10:
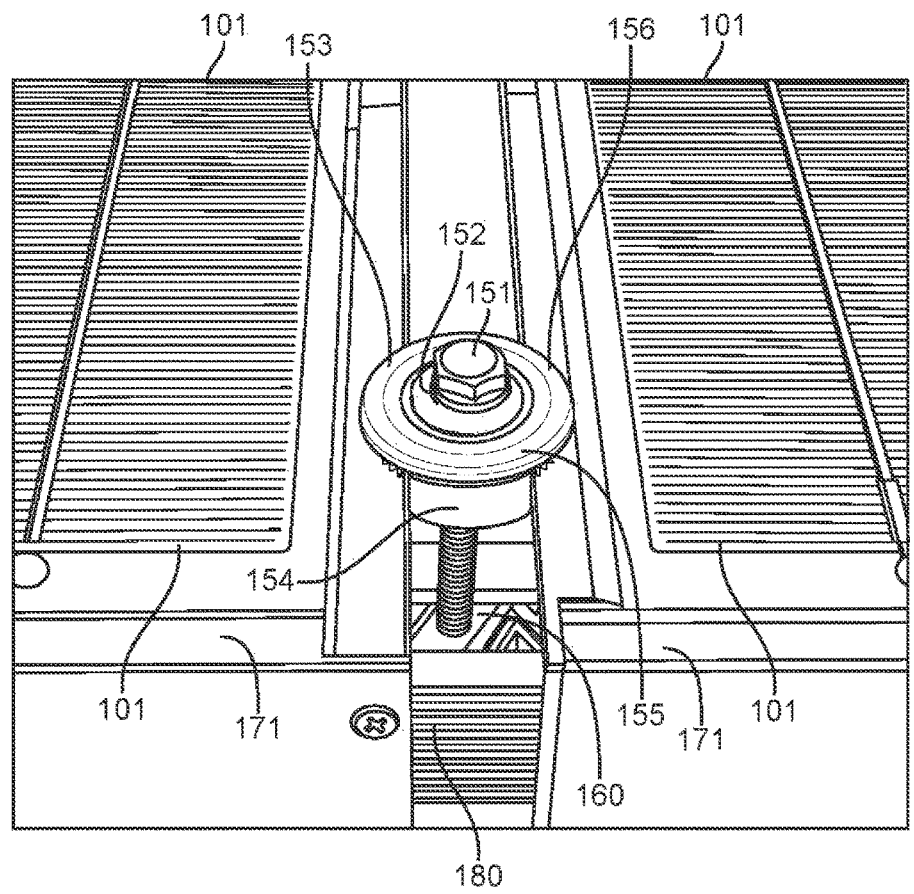
FIG. 10 illustrates schematic, perspective view of the fastener and top plate connection in a rail mount design in accordance with an embodiment of the present invention.

Referring to FIGS. 9A and 9B, a grounding mid-clamp assembly 150 is illustrated in operation with a bracket mount and rail mount system, respectively, according to embodiment of the present invention. In bracket and rail mounts, the mid-clamp assembly 150 is arranged between two adjoining edges of the frame 171 spacing each PV panel 101 predetermined distance apart using advantageously the downwardly extending tab of the tabbed-spacer as is shown in FIG. 10. In a bracket mount design, the lower threads of the bolt 151 configured to be received by threaded connection 123 in the top plate 120 so as to fasten and secure the tabbed-spacer 153 to the mounting system 100 and ground PV panel 101 thereby as shown in FIG. 9A. In a rail mount design, the bolt 151 of the grounding mid-clamp assembly 150 is received in a treaded hole 163 of the channel nut 160 disposed in the channel of the track 180 as illustrated in FIG. 9B. By tightening bolt 151, threaded shaft of the bolt 151 engages the threaded hole 163 of the channel nut 160 to pull the channel nut 160 against the channel track 180 thereby forming a grounding connection between the side portions 164, serrations 165 and the channel track 180.

Figure 29:
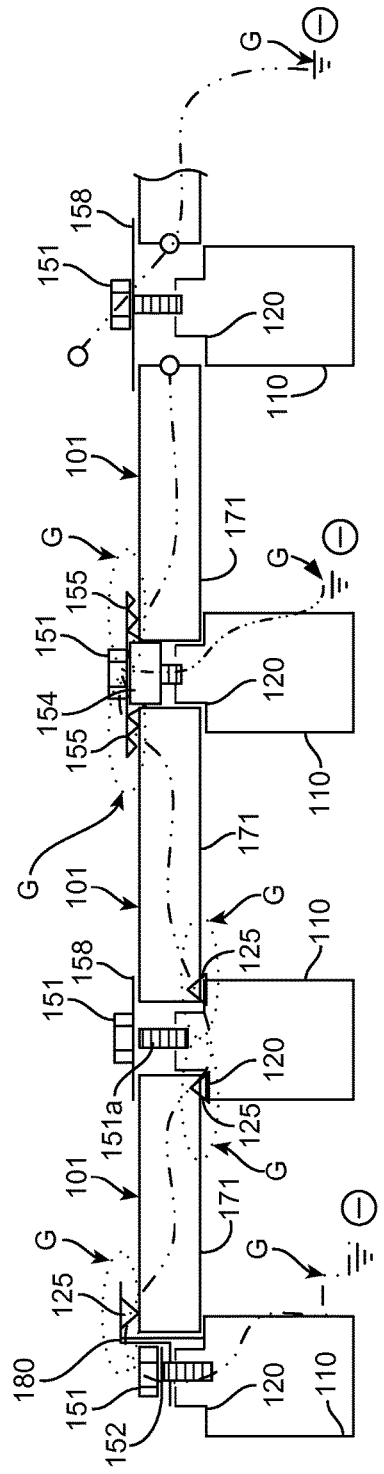
FIG. 29 illustrates schematic side view illustrating a grounding pattern in accordance with an embodiment of the present invention with illustration of a break or incomplete ground.

As is illustrated in FIGS. 21 through 27, a rail mount 200 is configured to implement the features and advantages of the mounting system 100 of the present invention. The rail mount 200 comprises a base assembly 210 that can be configured as a shoe base 201 connected to a host or stand 202. The shoe base 201 of the base assembly 210 may be formed with one or more holes 203 for securing to the support structure so as to anchor the rail mount 200 thereto. The stand 202 is a fixed to the base 201 at a lower and at an upper end the stand 202 may be configured to secure an L-foot 204 thereto by a threaded hole 207 four receiving a fastener 205. The shoe base 201 and stand 202 may be formed in various dimensions such as, for example, different lengths to provide different height dimensions. The L-foot 204 operably couples to an L-bracket 206 that couples to the track 230 of the rail mount 200 so as to provide angular adjustments such as, for example to accommodate the rail at a proper angle to orient the PV panel 101 for optimal solar energy exposure. A full ground G of the frame 171 of the PV panels 101 is accomplished utilizing toothed portion 154 of the mid-clamp assembly 150 as is illustrated in FIGS. 21 and 29. The base assembly 210 is configured to secure a frontal portion of the PV panel 101 to the support structure.

Similarly, the rail mount 200 orients a rear portion of the PV panel 101 utilizing an elevation assembly 220 connected to the track 230. The elevation assembly 220 may be configured with an elevation assembly 220 coupled to the base assembly 210 to secure the elevation assembly 220 to the track 230 and the base assembly 210 to the support structure. The similar component parts of the base assembly 210 are utilized including the shoe base 201 with holes 203 for securing to the structure, the stand 202 for securing the L-foot 204 thereto utilizing the one or more fasteners 205 and threaded hole 207, a telescopic leg assembly 221 with an integral adjustment arm 222, and the L-bracket 206 configured to attach the elevation assembly to the track 230 utilizing fasteners 205. In operation, frame 171 the PV panel 101 is attached to the track 230 which is secured to and supported by elevation assembly 220 and base assembly 210 of the rail mount 200. The mid-clamp assembly 150 is utilized to secure between adjacent frames 171 of PV panels 101 utilizing the channel nut assembly 160 secured in the track 230. A full ground G of the frame 171 of the PV panels 101 is accomplished utilizing toothed portion 154 of the mid-clamp assembly 150 as is illustrated in FIGS. 21 and 29. An end clamp assembly 240 and or the grounding end plate 180 may be utilized on the terminating edge of the frame 171 of the PV panel 101 in a solar array as is shown in FIG. 29. Accordingly, the frame 171 may be secured to the rack mount 200 according to an embodiment of the present invention so as to elevate and orient one or more PV panels 101 in a row of a solar array. The design of the rack mount 200 provides a mounting system 100 advantageously that minimizes component parts, supports panels above the surface, simplifies installation thereof, provides improved maintenance as installed component parts are made easily accessible, which is an improvement over the art.

Figure 25:
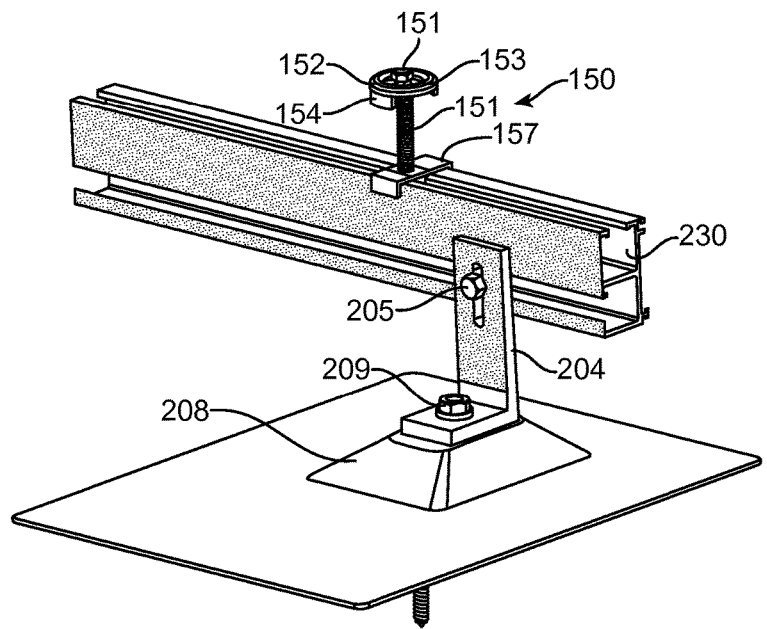
FIG. 25 illustrates schematic, perspective view of a mounting post in the rail mount in accordance with an embodiment of the present invention.

Referring to FIG. 25, the rail mount 200 of the mounting system 100 can comprise a composite shingle with a flashing 208 and secured by a sealing fastener 209 utilizing a large nut. The L-foot 204 is disposed on the post between the flashing 208 and sealing fastener 209. The track 230 may be secured to the L-Foot 204 by fastener 205 and a channel nut assembly 160 mounting to the track 230 in the horizontal plane. The frame 171 of the PV panel 101 may be mounted on the track 230 and secured thereto by the channel nut assembly 150 with the channel nut assembly 160 as shown in FIG. 21. Consequently, the rack mount 200 provides a mounting system 100 for post on structures advantageously that minimizes component parts, supports panels above the surface, simplifies installation thereof, provides improved maintenance as installed component parts are made easily accessible, which is an improvement over the art.

Figure 26:
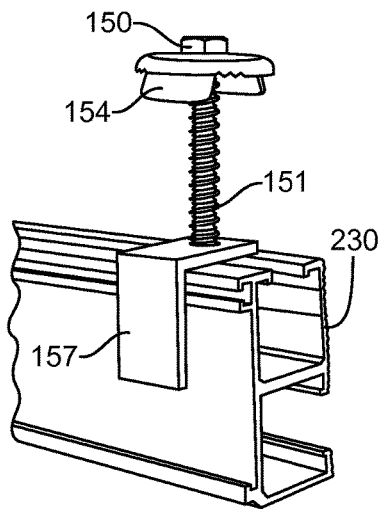
FIG. 26 illustrates schematic, perspective view of a tab for spacing between frames in the rail mount of the present invention.
Figure 27:
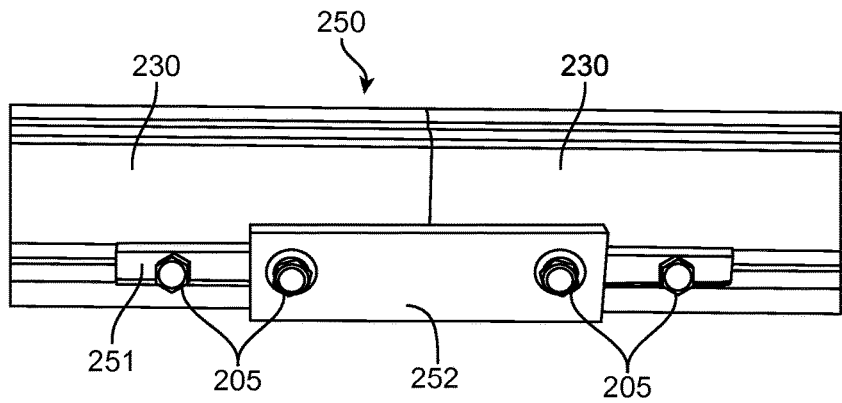
FIG. 27 illustrates schematic, perspective view of a splice bar in the rail mount of the present invention.
Figure 34A:
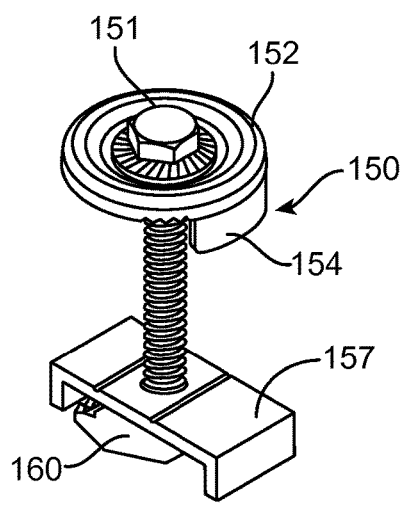
FIGS. 34A and 34B illustrate a perspective and side view illustrating the standing mid-clamp assembly of the present invention.
Figure 34B:
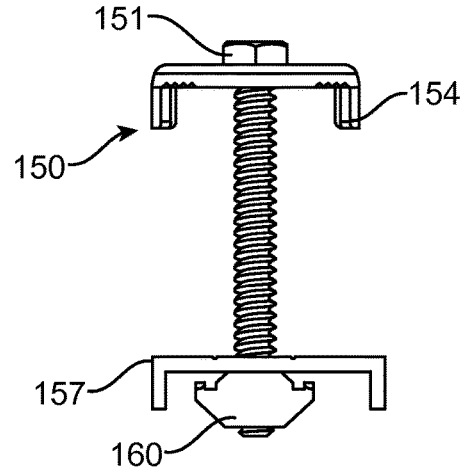

Referring to FIGS. 26, 34A, and 34B, the rail mount 200 of the mounting system 100 may further utilize a tab 157 with the mid-clamp assembly 150 to provide additional spacing and securing from environmental factors when the frame 171 of the PV panel 101 are mounted on the track 230. Referring to FIG. 27, the rail mount 200 of the mounting system 100 may be formed to utilize a grounding splice bar assembly 250 to join sections of track 230 of the rail mount 200 for a solar array. The splice bar assembly 250 comprises an inner bar 241 and an outer bar 252 secured by fasteners 205. For example, the fasteners 205 on the inner bar 251 are tightened which urges the inner bar against the inner wall of the slot in the horizontal opening in track 230. Similarly, the fasteners join with holes in the inner bar 251 so as to operably join inner bar 251 and outer bar 252 to ground the track 230 and secure from environmental factors when the frame 171 of the PV panel 101 are mounted on the track 230.

As is illustrated in the rail mount design in FIG. 10, tightening threads 151a of the bolt 151 urges the channel nut 160 against the track thereby compressing and securing the metal frame 171 of the PV panel 101 to the rail mount. The washer 153 of the mid-clamp assembly 150 is arranged between metal frames 171 of the PV panels 101. The toothed portion 154 and flat portion 155 are arranged on and upper surface of the metal frames 171 so that the toothed portion 155 forms to form a grounding connection with the metal frame 171 of the PV panel 101 such as, for example, forming a ground by biting through layers of anodization, paint and the like on the metal frame 171 when the bolt 151 is tightened. The flat portion 155 remains close to the PV panel 101 and functions to distribute the tightening force so that the glass of the PV panel 101 does not break when secured. The flat portion 155 is adapted to not form a grounding connection with the metal frame 171 of the PV panel 101. Similarly, upon tightening, the locking washer 152 is positioned between the bolt 151 and tab 154 of the tabbed-spacer 153 and provides distribution of a locking force so as not to crack or damage a PV panel 101 when securing to the frame of the mounting system 100.

Figure 11:
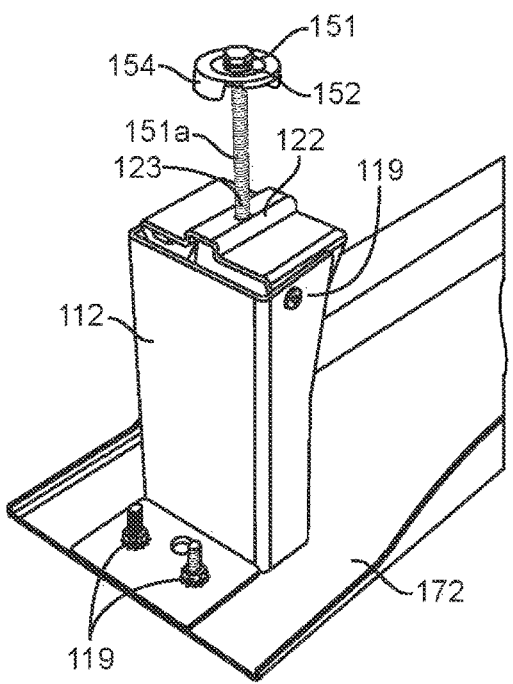
FIG. 11 illustrates schematic, perspective view of the fastener and top plate connection in the present invention bracket mount design.
Figure 12:
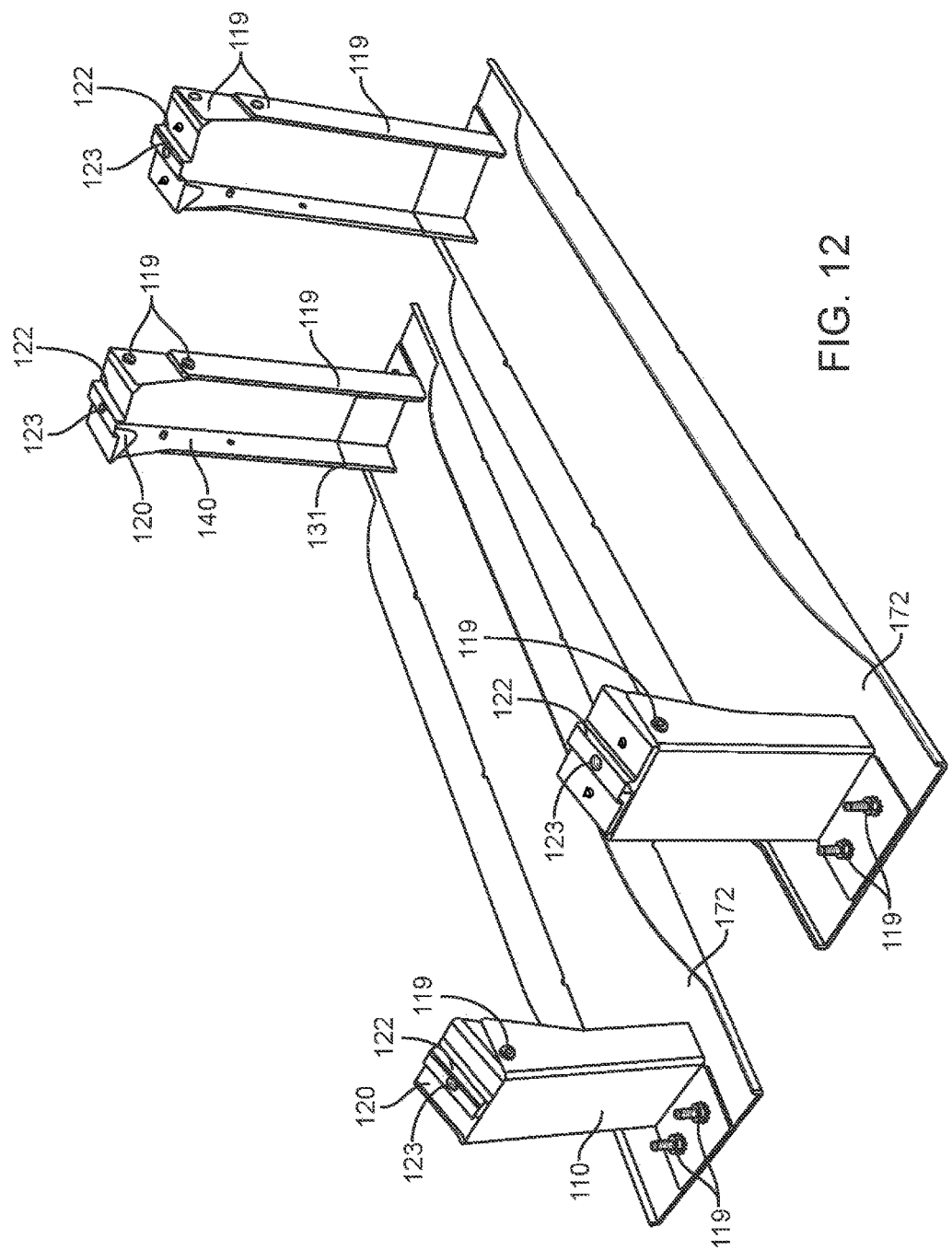
FIG. 12 illustrates schematic, perspective view of the bracket mount design in accordance with an embodiment of the present invention.

The lock washer 152 also is adapted to compress providing a locking force so that the bolt 151 does loosen under environmental conditions (i.e. does not back out over time). The locking force of the lock washer 152 is useful in maintaining the grounding circuit under various environmental factors such as, for example, seismic, winds and other forces. Similarly, the locking force of the lock washer 152 also functions with the flat portion 156 of the tabbed-spacer 153 with tab 154 to maintain the securing force against the metal frame 171 so as not to puncture the frame 171 or shatter the glass of the PV panel 101 under various environmental factors. Accordingly, the flat portion 156 of the tabbed-spacer 153 operates advantageously to distribute compression force and hold the PV panel 101 thereby preventing potential damage to the solar panel as may result in conventional systems from loosening under environmental conditions. Similarly, in a bracket mount design shown in FIG. 11, the top plate 120 is configured with solar panel portions 121 and raised spacer 122 formed integrally in the top plate 120 maintain separation between frame(s) 171 in a solar array. Supplemental, separation between frame(s) 171 in a solar array may be maintained by tab(s) 151 of the tabbed-spacer 153 with grounding teeth 154, without use of the channel nut 160, as the threads 151*a* of the bolt 151 as shown in FIGS. 10 and 11.

Figure 28:
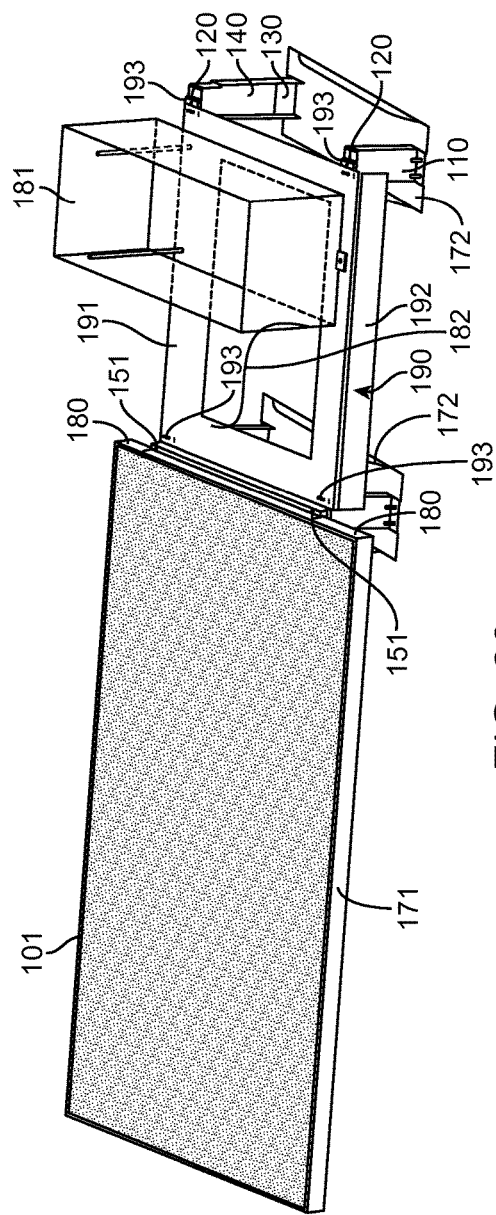
FIG. 28 illustrates schematic, perspective view of the top plate in accordance with an embodiment of the present invention.

As is shown in FIG. 28, according to the embodiment of the present invention, the mounting system 100 may include an equipment plate 190 that may be arranged in-line with other PV panels 101 of an solar array. For example, the equipment plate 190 may have a generally square and/or rectangular shape similar in size and dimension to an frame 171 of the PV panel 101. The equipment plate may have and elongated face 191 and flange 192 forming an edge overhang as shown in FIG. 28. The equipment plate 190 may be arranged anywhere along an array of PV panels 101. In one embodiment, the equipment plate 190 is arranged at the end of an array of PV panels 101 of the solar array. The last PV panel 101 secures the frame 171 by end plate 180 utilizing fasteners 151 that secure to the underlying top plate 120. The equipment plate 190 is arranged adjacent the end plate 180 and lies flat across and between two bracket mounts: (1) one bracket mount supporting and edge of the equipment plate 190 terminating the solar array as well as (2) another bracket mount supporting and edge of the equipment plate 190 and the PV panel 101 (e.g. the assembly of the base bracket 110 and top bracket 120, the elevation assembly 130 formed by base bracket 131, interleave bracket 140 and top bracket 120, which are secured to the ballast plate 172 for ballast 179 (FIG. 13)). The equipment plate 190 may be secured to the top plate 120 by one or more suitable fasteners 193 such as, for example, corrosion resistant self-tapping sheet metal screws. Securing the equipment plate 190 takes into consideration that the overhang flange 192 may be flush with the base bracket 110, which can also be secured using suitable fasteners to provide additional structure for withstanding environmental conditions. Inverters or other electrical equipment 181 and accompanying wires 182 four such electrical equipment 181 may be secured directly to the equipment plate 190 utilizing one or more fasteners 193. Accordingly, the electrical equipment 181 and wires 182 are elevated advantageously above the surface, installation thereof is simplified, maintenance and replacement is improved, and any such equipment installed is made easily accessible, which is an improvement over the art.

Referring to FIG. 29, according to the various embodiments of the present invention, the mounting system and method 100 can provide a complete and full ground of the PV panel(s) 101 in a solar array whether using a bracket and/or rail mount designs. The grounding diagram of FIG. 29 illustrates a ground, represented by element G, and the connection and by dashed line thereof. For simplicity, a bracket mount design using the base bracket 110 attached to the top plate 120 can illustrate the methodology of fully grounding. An absolute ground G is made to the earth and electrically secured to the base bracket 110. As the bracket mount design of the mounting system 100 is assembled, certain components continue the ground by making connections to electrical equipment 181 and the frames 171 of the PV panels 101. For example, a ground G is formed at a termination end during the installation of an end plate 180 because the threads 151*a* of bolt 151 engage threaded aperture 123 of the top plate 120 forcing the spike 125 into the frame 171. At the end of the solar array, the end plate 180 the ground G passes through the contact between the spike 125 in the frame 171, the threads 151*a* to the bracket base assembly 110 to the system ground. A lock washer 152 or other non-grounding washer 158 may be used as grounding is formed by the spike 125 biting into the frame 171. At central locations in the solar array, grounds are formed between panel frames 171 (i.e. a panel-to-panel grounding path) using the tabbed-spacer 153 of the mid-clamp assembly 150. The ground continues along the metal frame 171 to the mid-clamp assembly 150. At any of the numerous mid-points between PV panels 101 and a solar array, the mid-clamp assembly 150 can be utilized to create a ground. At the opposite end, as is represented by an open circuit in the dashed ground-line of FIG. 29, no ground G is formed in the bracket mount because no spikes 125 integral to a top plate 120 and/or an end plate 180, or the teeth portion 155 of the tabbed-spacer 153, dig into the metal of frame 171 to create a ground G.

Figure 2B:
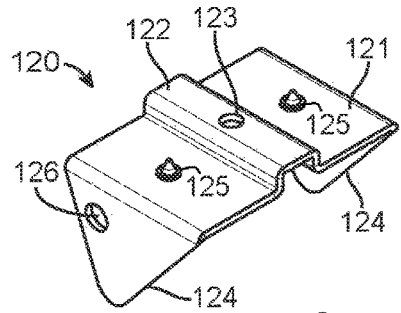

According to one embodiment of the present invention, a ground is formed utilizing the top plate 120 formed with spikes 125 as is shown in FIG. 2B. The threads 151*a* of bolt 151 and the non-grounding washer 158 can force the metal frame 171 of the PV panel 101 into the spikes 125 of the top plate 120 thereby creating a ground G. The grounding path continues from absolute ground through each of the frames 171 of adjacent PV panels 101.

According to another embodiment of the present invention, a ground is formed utilizing the tabbed-spacer 153 and top plate 120 as is shown in FIG. 2A. The threads 151*a* of bolt 151 and tabbed-spacer 153 can force the toothed portion 155 into the metal frame 171 of the PV panel 101 thereby creating a ground G. as discussed herein, the bolt 151, washer 152, tabs of the tabbed-spacer 153, toothed portion 154, flat portion 156 of the tabbed-spacer 153 coordinate with the raised portion 122 of the top plate 120 two maintain spacing between the metal frames 171 of adjacent PV panels 101. The grounding path continues from absolute ground through each of the frames 171 of adjacent PV panels 101.

According to the embodiment of the present invention, the mounting system 100 may be used and assembled in a cost efficient manner such as, for example, the layout for a solar array in a rail mount design can be established portrait and/or landscape on a roof such as, for example, the frame can be set with rails parallel to the rafters (i.e. portrait) or horizontal to the rafters (i.e. landscape). Each of the base bracket 111, 131 may be secured to the roof 103, for example, base bracket 111 may be secured through the conical hole 118 with a seal so that the installation does not require a flashing (or filling the hole with approved roofing sealant), whereby inserting a fastener 119 to secure to the roof engages the hole and seal thereby sealing the connection through the roof.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A modular rack mount system for securing a photovoltaic (PV) panel to a support structure, the rack mount system comprising:
a frame configured with front, rear and side portions for holding the PV panel in a predetermined angle spaced apart from the supporting structure;
a plurality of top plates configured for supporting said frame, each top plate comprises a raised portion formed on an upper surface having a threaded opening configured for receiving a fastener, and a pair of out-turned top plate flanges for supporting said top surface, and each top plate flange having a flange opening on a portion thereof, said top plate flange capable of operably connecting to one or more base assemblies and/or one or more elevation assemblies;
each of said base assemblies comprising:
a base bracket comprising a plurality of sides formed by an out-turned bend at least two of said sides having upper portions with an opening for operably coupling to said top plate flanges, and an out-turned base flange located on a lower portion thereof, said base flange configured with an opening in said base flange for securing said base flange to the support structure, said base bracket configured to align said openings of said top plate flanges with said openings in said upper base assembly, said base bracket configured to support said front portion of said frame adjacent said raised portion of said top plate;
each of said one or more elevation assemblies comprising:
another of said base bracket and an interleave bracket comprising a plurality of sides formed by an out-turned bend having a plurality of openings in at least two of said sides, said plurality of openings being formed in an upper portion of said at least two sides configured to operably couple said top plate flanges of another of said top plate to said openings in said interleave bracket using one or more fasteners, said interleave bracket further comprising openings along said at least two sides of said interleave bracket to operably couple to openings in the upper portion of said at least two sides of the another of said base bracket using one or more fasteners so as to form a predetermined length, and said interleave bracket configured to secure a rear portion of said frame to said upper surface of each of said top plates
whereby said predetermined length of said each elevation assembly is configured by fastening said one or more fasteners to a selected one of said plurality of openings in at least two of said sides of said interleave bracket to said openings in at least two of said sides of said base bracket so as to establish said predetermined angle by adjusting a height of said rear portion of said frame; and
a plurality of a mid-clamp assemblies, each comprising a bolt, a washer, a tabbed-spacer configured for operably connecting to said raised portion of said plurality of top plates so as to secure said frame to said structure, said bolt configured to be received in said threaded opening in each of said top plates of respective said base assembly and/or said elevation assembly for connecting to said frame for spacing said frame a predetermined distance apart and a toothed portion adjacent said tab for operably connecting to said frame, said base assembly and/or said elevation assembly to ground to the structure.

2. The modular rack mount system of claim 1, further comprising an end plate configured for grounding an outside edge of said frame in a solar array, said end plate comprising an elongated member configured with a slot located adjacent said opening of said raised portion of each of said top plates of respective said base assembly and each of said top plates of respective said elevation assembly, said elongated member further configured with a spike on a surface adjacent said aperture so as to secure and ground the PV panel and/or said frame using a fastener connected to said threaded opening of said top plate, wherein said slot is configured in a dimension to provide adjustability of said end plate in relation to said top plates relative to each of said base assembly and/or elevation assembly in rows of said solar arrays.

3. The modular rack mount system of claim 1, wherein said tabbed-spacer further comprising a flat portion adjacent said toothed portion and adjacent said frame, said flat portion cooperating with said washer for securely holding said frame.

4. The modular rack mount system of claim 1, wherein one or more of said top plates further comprises one or more spikes disposed on said upper surface adjacent said raised portion, said one or more spikes configured to operably ground said frame and/or the PV panel.

5. The modular rack mount system of claim 1, further comprises a ballast pan adapted to receive ballast so as to maintain the modular rack mount system under environmental conditions, said ballast pan being in the elongated-tray shape with integral drain holes, said ballast pan being configured to operably connect to said base bracket of said base assembly and said elevation assembly to provide grounding to said frame.

6. The modular rack mount system of claim 1, further comprises a solar belt configured to operably connect said elevation assembly of a first solar array to said base assembly of a second solar array, said solar belt configured for connecting said flange of said base bracket of said base assembly in said first solar array to a flange of said base bracket of said elevation assembly in an adjacent row of said second solar array at a predetermined distance for optimal exposure.

7. The modular rack mount system of claim 6, further comprises a seismic plate configured to operably connect to said solar belt at a midpoint thereof, said seismic plate configured to provide grounding to said frame, said seismic plate configured to prevent lateral displacement of adjacent rows of said first and second solar arrays.

8. A modular rail mount system for securing a photovoltaic (PV) panel to support structure, the rail mount system comprising:
a frame configured with front, rear and side portions for holding the PV panel in a predetermined angle spaced apart from the supporting structure;
a plurality of tracks operably coupled to at least one of a base assembly configured to join the end portions of one of said plurality of tracks spaced apart from the structure and at least one of an elevation assembly configured to secure ends of another of said plurality of tracks spaced apart from the structure, whereby
said base assembly comprises a stand having an upper portion for receiving a fastener and a lower portion connected to a shoe base, said shoe base configured with an opening in said base assembly for a fastener to attach to said support structure, an L-foot having a slot in a vertically extending portion for operably connecting to said shoe base, and an L-bracket for connecting to one of said plurality of tracks and to said L-foot using a fastener so as to secure said front portion to said frame to said track along with said base assembly to said support structure;

said elevation assembly comprises another of said stand, said L-foot, said L-bracket, and a telescopic leg assembly for connecting using a plurality of fasteners to another of said plurality of tracks, said stand being operably connected to said L-foot at said upper portion and to said structure at said shoe base using said fasteners, said telescopic leg assembly connects at one end to said slot of said vertically extending portion and, at another end, is configured with an integral adjustment arm disposed in said telescopic leg assembly, said integral adjustment arm configured to operably couple to said L-bracket to operably couple to said another of said plurality of tracks using a fastener to secure bottom portion of said frame to said elevation assembly, and said telescopic leg assembly configured to adjust said integral adjustment arm to a predetermined length to elevate said frame;

one or more mid-clamp assemblies each comprising a fastener, a channel nut configured to receive said fastener and to be disposed in each of said plurality of tracks, a washer, a tabbed-spacer configured with at least one tab for spacing the frame a predetermined distance apart from an adjacent frame in a solar array, a toothed portion located adjacent said tab for operably grounding said frame, and said channel nut configured for operably connecting with said fastener using a threaded portion of said fastener to secure in each of said plurality of tracks and to affix said tooth portion to said frame forming a ground thereby; and a grounding clip configured to secure said front, rear, and/or side portions of said frame to at least one of said plurality of tracks using another bolt disposed in said grounding clip and to operably connect to said channel nut so as to secure said channel nut in said track, said grounding clip being configured with at least one spike for grounding said frame.

9. The modular rail mount system of claim 8, wherein said tabbed-spacer further comprising a flat portion configured to apply securing force to said frame, said flat portion extending over said PV panel frame for cooperating with said washer for securely holding the frame.

10. A modular rack mount system for securing a photovoltaic (PV) panel disposed in a frame configured with front, rear and side portions in a predetermined angle to a support structure, the rack mount system comprising:

a plurality of top plates configured for supporting said frame, each top plate comprises a raised portion formed on an upper surface having a threaded opening configured for receiving a fastener, a pair of out-turned top plate flanges for supporting said top surface, and each top plate flange having a flange opening on a portion thereof configured for operably connecting to one or more base assemblies and/or one or more elevation assemblies;

each said base assembly comprising:

a base bracket comprising a plurality of sides formed by an out-turned bend having at an upper portion for operably coupling to said top plate flanges with openings in at least two of said side portions, and an out-turned base flange located on a lower portion thereof, said base flange configured with an opening for securing said base flange to the support structure, said base bracket configured to align said openings of said top plate flanges with said openings in said upper portion of each of said two of said side portions for operably coupling using one or more fasteners to said base assembly using one or more fasteners, said base bracket configured to support said front portion of said frame adjacent said raised portion of said top plate;

each of said elevation assembly comprising:

an interleave bracket comprising a plurality of sides formed by an out-turned bend having a plurality of openings in at least two of said sides, said plurality of openings comprising openings in an upper portion for operably coupling said top plate flanges of another of said top plate using one or more fasteners, and openings along said at least two sides of said interleave bracket operably coupled to said at least two sides of another of said base bracket using said one or more fasteners so as to form a predetermined length, said interleave bracket configured to secure a rear portion of said frame to said upper surface of said top plate, whereby said predetermined length of said elevation assembly is configured by fastening said one or more fasteners to a selected one of said plurality of openings in at least two of said sides of said interleave bracket to said openings in said a least two sides of said base bracket so as to establish said predetermined angle by adjusting a height of said rear portion of said frame; and a plurality of mid-clamp assemblies each comprising a bolt disposed in a washer and in a tabbed-spacer configured for operably connecting to said threaded opening in said raised portion of said plurality of top plates so as to secure said frame to said structure, said bolt being received in said threaded opening of said top plates of said base assembly and/or said elevation assembly for connecting the frame, said tabbed-spacer comprising at least one tab, a toothed portion and at least one flat portion adjacent said toothed portion, said tab configured for spacing the frames a predetermined distance apart, said toothed-portion located adjacent said tab for operably connecting to said frame and said base assembly and/or said elevation assembly to provide grounding to the structure.

11. A modular rail mount system for securing a photovoltaic (PV) panel disposed in a frame configured with front, rear and side portions in a predetermined angle spaced apart from a support structure, the rail mount system comprising:

a plurality of tracks operably coupled to at least one of a base assembly configured to secure end portions of one of said plurality of tracks spaced apart from the structure and at least one of an elevation assembly configured to secure ends of another of said plurality of tracks spaced apart from the structure, whereby said base assembly comprising a stand comprising an upper portion for receiving a fastener and a lower portion connected to a shoe base configured with an opening for a fastener to attach to said supporting structure, an L-foot having a slot in a vertically extending portion and an opening in a base portion for operably connected to said shoe base, and an L-bracket for connecting to one of said plurality of tracks and to said L-foot using fasteners, so as to secure said front portion of said frame to said track, said base assembly to said support structure;

said elevation assembly comprising another of said stand, said L-foot, said L-bracket and a telescopic leg assembly for connecting using a plurality of fasteners to another of said plurality of tracks, said stand being operably connected to said L-foot at said upper portion and to said structure at said shoe base using said fasteners, said telescopic leg assembly connects at one end to said slot of said vertically extending portion and at another end is configured with an integral adjustment arm disposed in said telescopic leg assembly, said integral adjustment arm configured to operably couple to said L-bracket and to operably couple to said track so as to secure said bottom portion of said frame to said elevation assembly, and said telescopic leg assembly configured to adjust said integral adjustment arm to a predetermined length so as to elevate a rear portion of said frame;

one or more mid-clamp assemblies each comprising a fastener, a channel nut configured to received said fastener and to be disposed in said track, a washer, a tabbed-spacer configured with at least one tab for operably connecting between two frames thereby holding the PV panels in a solar array a predetermined distance apart, said mid-clamp assembly configured for operably connecting said frame to said plurality of tracks of said rail mount system and for operably grounding said frame, and said channel nut operably connects to said fastener configured to tighten with a threaded portion to secure in said track and to affix said tooth portion in said frame forming a ground; and a grounding clip configured to secure said front, rear, and/or side portions of said frame to said tracks using another bolt disposed in said grounding clip and operably connecting to said channel nut so as to secure said channel nut in said track, said grounding clip configured to secure and ground said frame at the ends in a solar array, and said grounding clip being configured with at least one spike for grounding said frame.

* * * * *